United States Patent
Li et al.

(10) Patent No.: US 12,231,329 B2
(45) Date of Patent: Feb. 18, 2025

(54) METHOD FOR FORWARDING PACKET ON SR NETWORK, DEVICE, AND SYSTEM

(71) Applicant: HUAWEI TECHNOLOGIES CO., LTD., Guangdong (CN)

(72) Inventors: Cheng Li, Beijing (CN); Zhenbin Li, Beijing (CN); Yang Xia, Beijing (CN); Taixu Tian, Dongguan (CN); Yaqun Xiao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 187 days.

(21) Appl. No.: 17/703,614

(22) Filed: Mar. 24, 2022

(65) Prior Publication Data

US 2022/0217081 A1 Jul. 7, 2022

Related U.S. Application Data

(63) Continuation of application No. PCT/CN2020/073785, filed on Jan. 22, 2020.

(30) Foreign Application Priority Data

Sep. 27, 2019 (CN) .......................... 201910925974.3

(51) Int. Cl.
*H04L 45/42* (2022.01)
*H04L 45/00* (2022.01)
(Continued)

(52) U.S. Cl.
CPC ............ *H04L 45/42* (2013.01); *H04L 45/122* (2013.01); *H04L 45/127* (2013.01); *H04L 45/566* (2013.01)

(58) Field of Classification Search
CPC ..... H04L 45/42; H04L 45/122; H04L 45/127; H04L 45/566; H04L 45/02; H04L 45/74;
(Continued)

(56) References Cited

U.S. PATENT DOCUMENTS

| 11,245,617 B1* | 2/2022 | Bonica ................. H04L 12/4633 |
| 2014/0064259 A1* | 3/2014 | Lee .......................... H04L 45/74 370/338 |

(Continued)

FOREIGN PATENT DOCUMENTS

| CN | 105282028 A | 1/2016 |
| CN | 105471737 A | 4/2016 |

(Continued)

OTHER PUBLICATIONS

Z. Li et al. Compressed SRv6 Network Programming draft-li-spring-compressed-srv6-np-00 Spring Working Group Internet-Draft (Year: 2019).*

(Continued)

*Primary Examiner* — Bryan Y Lee

(57) ABSTRACT

A method for processing a packet on an SR network is provided, including: receiving a packet, where a packet header of the packet includes a destination address field, a first pointer, a second pointer, and a list used to process the packet, the list includes a plurality of sequentially arranged identifiers, and a value of the first pointer and a value of the second pointer jointly indicate a location of a first identifier in the plurality of identifiers in the list; determining the first identifier based on the value of the first pointer and the value of the second pointer; and copying the first identifier to the destination address field. In this method, a CL pointer is set in the packet header to jointly form a two-dimensional pointer with an SL pointer, to indicate a location of a C-SID in a SID list.

29 Claims, 12 Drawing Sheets

(51) Int. Cl.
*H04L 45/12* (2022.01)
*H04L 45/122* (2022.01)

(58) Field of Classification Search
CPC ..... H04L 45/34; H04L 45/741; H04L 49/109;
H04L 49/258; H04L 49/3009; H04L
49/9015; H04L 45/00; H04L 45/22; H04L
45/12; H04L 45/25; H04L 49/00
USPC .................................................. 709/238, 243
See application file for complete search history.

(56) References Cited

U.S. PATENT DOCUMENTS

| | | |
|---|---|---|
| 2014/0169370 A1 | 6/2014 | Filsfils et al. |
| 2014/0269422 A1 | 9/2014 | Filsfils et al. |
| 2014/0369356 A1* | 12/2014 | Bryant .................... H04L 45/50 370/392 |
| 2015/0256456 A1 | 9/2015 | Previdi et al. |
| 2018/0337856 A1* | 11/2018 | Previdi ................. H04L 45/308 |
| 2018/0375766 A1 | 12/2018 | Filsfils et al. |
| 2019/0081897 A1 | 3/2019 | Shakir et al. |
| 2020/0366763 A1* | 11/2020 | Bonica ................. H04L 12/4633 |

FOREIGN PATENT DOCUMENTS

| | | |
|---|---|---|
| CN | 108429685 A | 8/2018 |
| CN | 109218189 A | 1/2019 |
| CN | 109981457 A | 7/2019 |
| EP | 2974164 A1 | 1/2016 |
| WO | 2014163863 A1 | 10/2014 |
| WO | 2017016254 A1 | 2/2017 |

OTHER PUBLICATIONS

Z. Li et al, Compressed SRv6 Network Programming; draft-li-spring-compressed-srv6-np-00, Jul. 22, 2019, 15 pages.
R. Bonica et al, The IPV6 Compressed Routing Header (CRH); raft-bonica-6man-comp-rtg-hdr-03, Mar. 23, 2019, 16 pages.
C. Filsfils et al., SRv6 Network Programming;draft-ietf-spring-srv6-net work-programming-01, Jul. 3, 2019, 47 pages.

* cited by examiner

| Version | Traffic Class | Flow Label ||
|---|---|---|---|
| Payload Length || Next Header | Hop Limit |
| Source Address ||||
| Prefix ||||
| C-SID 1 ||||
| Next Header | Hdr Ext Len | Routing Type | SL |
| Last Entry | Flags | Tag ||
| SID ||||
| *EOC* ||||
| C-SID 7 ||||
| C-SID 6 ||||
| C-SID 5 ||||
| C-SID 4 ||||
| C-SID 3 ||||
| C-SID 2 ||||
| C-SID 1 ||||
| SID ||||
| Optional TLV objects (variable) ||||
| IPv6 Payload ||||

FIG. 5A

| Version | Traffic Class | Flow Label | |
|---|---|---|---|
| Payload Length | | Next Header | Hop Limit |
| Source Address | | | |
| Prefix | | | |
| C-SID 1 | | | |
| Next Header | Hdr Ext Len | Routing Type | SL |
| Last Entry | Flags | Tag | |
| SID | | | |
| *EOC* | | | |
| C-SID 7 | | | |
| C-SID 6 | | | |
| C-SID 5 | | | |
| C-SID 4 | | | |
| C-SID 3 | | | |
| C-SID 2 | | | |
| SPECIAL SID | | | |
| SID | | | |
| Optional TLV objects (variable) | | | |
| IPv6 Payload | | | |

FIG. 5C

METHOD FOR FORWARDING PACKET ON SR NETWORK, DEVICE, AND SYSTEM

CROSS-REFERENCE TO RELATED APPLICATIONS

This application is a continuation of International Application No. PCT/CN2020/073785, filed on Jan. 22, 2020, which claims priority to Chinese Patent Application No. 201910925974.3, filed on Sep. 27, 2019. The disclosures of the aforementioned applications are hereby incorporated by reference in their entireties.

TECHNICAL FIELD

This disclosure relates to the communication field, and in particular, to a method for forwarding a packet on an SR network, a network device, and a system.

BACKGROUND

Segment routing (SR) is a protocol designed based on a source routing concept to forward a data packet on a network, and supports explicit specifying of a forwarding path of a data packet on a source node. When being deployed on an Internet protocol version 6 (IPv6) data plane, the SR is referred to as segment routing over IPv6 (SRv6). The SRv6 extends a segment routing header (SRH) based on the IPv6.

The SRH includes a segment identifier list (SID list). The SID list includes a plurality of sequentially arranged segment identifiers (SIDs) that respectively indicate a plurality of segments. Each segment is an instruction or an instruction set for processing a packet. The SRH is encapsulated in a packet, and a processing process in which an SR network processes the packet is added to the segment identifier list of the SRH. A length of each SID on the SRv6 network is 128 bits. When every one SID is added to the SID list, a length of the SRH increases by 128 bits, and a length of the packet also increases by 128 bits. A large quantity of network resources, for example, bandwidth, are occupied in a forwarding process because the length of the packet increases. For example, when the packet processing process includes 100 segments, the SRH needs to include 100 SIDs. A length of the SID list is up to 1600 bytes, and the length of the SID list is excessively long. This reduces packet transmission efficiency on the SR network. In addition, the lengthy SRH makes packet processing more difficult. For example, a length of a packet window read by a node at one time is limited, for example, 128 bytes, while the length of the SRH is 1600 bytes, which is far greater than the length of the packet window read at one time. An entire SRH reading process needs to be completed after a plurality of read operations. This reduces packet processing efficiency.

SUMMARY

This disclosure provides a method for forwarding a packet, a device, and a system, to resolve a technical problem that network transmission efficiency and processing efficiency are reduced due to a lengthy segment identifier list.

According to a first aspect, this disclosure provides a packet processing method. The method is applied to a segment routing SR network and includes: receiving a packet, where a packet header of the packet includes a destination address field, a first pointer, a second pointer, and a list used to process the packet, the list includes a plurality of sequentially arranged identifiers, the plurality of identifiers are one-to-one mapped to a plurality of segments on the SR network, and a value of the first pointer and a value of the second pointer jointly indicate a location of a first identifier in the plurality of identifiers in the list; determining the first identifier based on the value of the first pointer and the value of the second pointer; and copying the first identifier to the destination address field.

In the method, the newly added first pointer is set in the packet header to jointly form a two-dimensional pointer with a segment left (segment left, SL) pointer, namely, the second pointer, to indicate a location of a compressed segment identifier (Compressed SID, C-SID) in a SID list. Therefore, a packet length is reduced, and transmission efficiency and processing efficiency of the network are improved.

With reference to the first aspect, in a first optional implementation of the first aspect, that the list includes a plurality of sequentially arranged identifiers is specifically: the list includes at least one sequentially arranged element. The at least one element includes a first element, the first element includes at least two sequentially arranged identifiers in the plurality of identifiers, and the first identifier is one of the at least two identifiers. That a value of the first pointer and a value of the second pointer jointly indicate a location of a first identifier in the plurality of identifiers in the list is specifically: the value of the second pointer is used to determine a location of the first element in the list, and the value of the first pointer is used to determine a location of the first identifier in the first element.

In the method, when the SID list is generated, the C-SID is used to indicate a segment instead of a SID whose length is 128 bits. Therefore, for two segments in which one segment whose quantity of C-SIDs is the same as a quantity of SIDs of the other segment, a length of a SID list including the C-SID is far less than a length of a SID list including the SID. Therefore, a packet length is reduced, and transmission efficiency and processing efficiency of the network are improved.

With reference to any one of the first aspect or the optional implementations of the first aspect, in a second optional implementation of the first aspect, the first pointer is included in a $1^{st}$ identifier in the at least two identifiers.

With reference to any one of the first aspect or the optional implementations of the first aspect, in a third optional implementation of the first aspect, that the value of the first pointer is used to determine a location of the first identifier in the first element is specifically: the value of the first pointer indicates a location of a second identifier in the first element. The second identifier is a previous identifier of the first identifier in the plurality of identifiers. The determining the first identifier based on the value of the first pointer and the value of the second pointer includes: modifying the value of the first pointer in the packet header of the packet, to enable a modified value of the first pointer to indicate the location of the first identifier in the first element; and determining the first identifier based on the modified value of the first pointer and the value of the second pointer.

With reference to any one of the first aspect or the optional implementations of the first aspect, in a fourth optional implementation of the first aspect, that the value of the first pointer is used to determine a location of the first identifier in the first element is specifically: the value of the first pointer indicates the location of the first identifier in the first element. After the copying the first identifier to the destination address field, the method further includes: modifying the value of the first pointer in the packet header of the packet, to enable a modified value of the first pointer to indicate a location of a second identifier in the first element, where the second identifier is a subsequent identifier of the first identifier in the at least two identifiers.

With reference to any one of the first aspect or the optional implementations of the first aspect, in a fifth optional implementation of the first aspect, that the value of the second pointer is used to determine a location of the first element in the list is specifically: the value of the second pointer indicates the location of a second element in the at least one element in the list. The second element is a previous element of the first element in the at least one element. That the value of the first pointer is used to determine a location of the first identifier in the first element is specifically: the value of the first pointer indicates a location of a second identifier in the second element. The second identifier is a previous identifier of the first identifier in the plurality of identifiers, the second element includes at least one identifier in the plurality of identifiers, the at least one identifier is sequentially arranged, the second identifier is one of the at least one identifier, and the destination address field includes the second identifier. The determining the first identifier based on the value of the first pointer and the value of the second pointer includes: determining that the second identifier is a last identifier in the at least one identifier; modifying the value of the second pointer in the packet header of the packet, to enable a modified value of the second pointer to indicate the location of the first element in the list; modifying the value of the first pointer in the packet header of the packet, to enable a modified value of the first pointer to indicate the location of the first identifier in the first element; and determining the first identifier based on the modified value of the first pointer and the modified value of the second pointer.

With reference to any one of the first aspect or the optional implementations of the first aspect, in a sixth optional implementation of the first aspect, that the value of the second pointer is used to determine a location of the first element in the list is specifically: the value of the second pointer indicates the location of the first element in the list. That the value of the first pointer is used to determine a location of the first identifier in the first element is specifically: the value of the first pointer indicates the location of the first identifier in the first element. After the copying the first identifier to the destination address field, the method further includes: determining that the first identifier is a last identifier in the at least two identifiers; modifying the value of the second pointer in the packet header of the packet, to enable a modified value of the second pointer to indicate a location of a second element in the list, where the second element is a subsequent element of the first element in the at least one element; and modifying the value of the first pointer in the packet header of the packet, to enable a modified value of the first pointer to indicate a location of a second identifier in the second element, where the second identifier is a subsequent identifier of the first identifier in the plurality of identifiers, and the second element includes the second identifier.

With reference to any one of the first aspect or the optional implementations of the first aspect, in a seventh optional implementation of the first aspect, the plurality of segments are one-to-one mapped to a plurality of segment identifiers, the plurality of identifiers are one-to-one mapped to the plurality of segment identifiers, each of the plurality of segment identifiers includes a first part and a second part, the first part is before the second part, first parts of all of the plurality of segment identifiers are the same, and each of the plurality of identifiers includes the second part of the segment identifier to which each identifier is mapped.

With reference to any one of the first aspect or the optional implementations of the first aspect, in an eighth optional implementation of the first aspect, the destination address field includes the first part.

With reference to any one of the first aspect or the optional implementations of the first aspect, in a ninth optional implementation of the first aspect, a length of the element is 128 bits, 64 bits, or 32 bits.

With reference to any one of the first aspect or the optional implementations of the first aspect, the plurality of segments are one-to-one mapped to a plurality of segment identifiers, the plurality of identifiers are one-to-one mapped to the plurality of segment identifiers, each of the plurality of segment identifiers includes a first part, a second part, and a third part that are sequentially arranged, first parts of all of the plurality of segment identifiers are the same, third parts of all of the plurality of segment identifiers are the same, and each of the plurality of identifiers includes the second part of the segment identifier to which each identifier is mapped.

With reference to any one of the first aspect or the optional implementations of the first aspect, a total length of the first part, the second part, and the third part is 128 bits.

With reference to any one of the first aspect or the optional implementations of the first aspect, the method further includes: receiving structure information of the destination address field, where the structure information indicates an addition location of the first identifier in the destination address field; and the copying the first identifier to the destination address field includes: copying the first identifier to the addition location of the first identifier in the destination address field based on the structure information.

With reference to any one of the first aspect or the optional implementations of the first aspect, the receiving structure information of the destination address field includes: receiving a control packet, where the control packet includes the structure information, and the control packet is an intermediate system-to-intermediate system IS-IS protocol packet, an open shortest path first OSPF protocol packet, or a border gateway protocol BGP packet.

With reference to any one of the first aspect or the optional implementations of the first aspect, a length of each of the plurality of identifiers is 32 bits or 16 bits.

According to a second aspect, this disclosure provides a packet forwarding method. The method is applied to a segment routing SR network and includes: receiving a packet; generating a packet header and encapsulating the packet header into the packet, where the packet header includes a first pointer, a second pointer, and a list used to process the packet, the list includes a plurality of sequentially arranged identifiers, the plurality of identifiers are one-to-one mapped to a plurality of segments on the SR network, and a value of the first pointer and a value of the second pointer jointly indicate a location of a first identifier in the plurality of identifiers in the list; and sending the packet encapsulated with the packet header.

In the method, the newly added first pointer is set in the packet header to jointly form a two-dimensional pointer with an SL pointer, namely, the second pointer, to indicate a location of a C-SID in a SID list. Therefore, a packet length is reduced, and transmission efficiency and processing efficiency of the network are improved.

With reference to any one of the second aspect or the optional implementations of the second aspect, the plurality of segments are one-to-one mapped to a plurality of segment identifiers, the plurality of identifiers are one-to-one mapped to the plurality of segment identifiers, each of the plurality of segment identifiers includes a first part and a second part, the first part is before the second part, first parts of all of the plurality of segment identifiers are the same, and each of the plurality of identifiers includes the second part of the segment identifier to which each identifier is mapped.

In the method, when the segment identifier list is generated, instead of a SID whose length is 128 bits, a compressed segment identifier is used to indicate a segment, so that a plurality of compressed segment identifiers corresponding to a plurality of segments can be accommodated in an element whose length is 128 bits and to which the SL pointer points in the segment identifier list. Therefore, a packet length is reduced, and transmission efficiency and processing efficiency of the network are improved.

With reference to any one of the second aspect or the optional implementations of the second aspect, the generating a packet header includes: using the second part of the segment identifier to which each segment in the plurality of segments is mapped as the identifier to which each segment is mapped, to generate the list; and generating the packet header based on the list.

With reference to any one of the second aspect or the optional implementations of the second aspect, in a third optional implementation of the second aspect, the generating a packet header includes: receiving the list, where each of the plurality of identifiers in the list includes the second part of the segment identifier to which the segment to which each identifier is mapped is mapped.

With reference to any one of the second aspect or the optional implementations of the second aspect, in a fourth optional implementation of the second aspect, a length of the first part is X bits, X is an integer, X is greater than or equal to 1 and less than 128, and a length of each of the plurality of identifiers is 128−X bits.

With reference to any one of the second aspect or the optional implementations of the second aspect, in a fifth optional implementation of the second aspect, the list does not include the first part.

With reference to any one of the second aspect or the optional implementations of the second aspect, in a sixth optional implementation of the second aspect, the packet header further includes a destination address field, and the generating a packet header and encapsulating the packet header into the packet further includes: adding the first part to the destination address field; and copying a $1^{st}$ identifier in the plurality of identifiers to the destination address field.

With reference to any one of the second aspect or the optional implementations of the second aspect, in a seventh optional implementation of the second aspect, that the list includes a plurality of sequentially arranged identifiers is specifically: the list includes at least one sequentially arranged element. A first element in the at least one element includes at least two sequentially arranged identifiers in the plurality of identifiers, and the first identifier is one of the at least two identifiers. That a value of the first pointer and a value of the second pointer jointly indicate a location of a first identifier in the plurality of identifiers in the list is specifically: the value of the second pointer indicates the location of the first element in the list, and the value of the first pointer indicates a location of the first identifier in the first element.

With reference to any one of the second aspect or the optional implementations of the second aspect, in an eighth optional implementation of the second aspect, the first pointer is included in a $1^{st}$ identifier in the at least two identifiers.

With reference to any one of the second aspect or the optional implementations of the second aspect, in a ninth optional implementation of the second aspect, the list includes a first segment identifier, the first segment identifier is before a $1^{st}$ identifier in the plurality of identifiers, the first segment identifier is mapped to the segment on the SR network, and a length of the first segment identifier is 128 bits.

With reference to any one of the second aspect or the optional implementations of the second aspect, in a tenth optional implementation of the second aspect, the first segment identifier is adjacent to the $1^{st}$ identifier in the plurality of identifiers, the first segment identifier includes a start indication, and the start indication is used to indicate that a subsequent identifier of the first segment identifier in the list is the $1^{st}$ identifier in the plurality of identifiers.

With reference to any one of the second aspect or the optional implementations of the second aspect, in an eleventh optional implementation of the second aspect, the first segment identifier includes a function field and an argument field, the function field includes the start indication, the argument field includes the first pointer and a quantity indication, and the quantity indication is used to indicate a quantity of the plurality of identifiers.

With reference to any one of the second aspect or the optional implementations of the second aspect, in a twelfth optional implementation of the second aspect, the list includes a second segment identifier, the second segment identifier is after a last identifier in the plurality of identifiers, the first segment identifier is mapped to the segment on the SR network, and a length of the first segment identifier is 128 bits.

With reference to any one of the second aspect or the optional implementations of the second aspect, in a thirteenth optional implementation of the second aspect, the second segment identifier is adjacent to the last identifier in the plurality of identifiers, the second segment identifier includes an end indication, and the end indication is used to indicate that a previous identifier of the second segment identifier in the list is the last identifier in the plurality of identifiers.

With reference to the second aspect, in a first optional implementation of the second aspect, the plurality of segments are one-to-one mapped to a plurality of segment identifiers, the plurality of identifiers are one-to-one mapped to the plurality of segment identifiers, each of the plurality of segment identifiers includes a first part, a second part, and a third part that are sequentially arranged, first parts of all of the plurality of segment identifiers are the same, third parts of all of the plurality of segment identifiers are the same, and each of the plurality of identifiers includes the second part of the segment identifier to which each identifier is mapped.

With reference to any one of the second aspect or the optional implementations of the second aspect, a total length of the first part, the second part, and the third part is 128 bits.

With reference to any one of the second aspect or the optional implementations of the second aspect, the packet header further includes a destination address field, and the generating a packet header and encapsulating the packet header into the packet further includes: adding the first part and the third part to the destination address field; and copying a $1^{st}$ identifier in the plurality of identifiers to the destination address field.

With reference to any one of the second aspect or the optional implementations of the second aspect, the method further includes: sending structure information to an intermediate network device, where the structure information indicates an addition location of the first identifier in the destination address field.

With reference to any one of the second aspect or the optional implementations of the second aspect, a length of each of the plurality of identifiers is 32 bits or 16 bits.

According to a third aspect, this disclosure provides a network device, to perform the method in any one of the first aspect or the optional implementations of the first aspect. Specifically, the network device includes a unit configured to perform the method in any one of the first aspect or the optional implementations of the first aspect.

According to a fourth aspect, this disclosure provides a network device, to perform the method in any one of the second aspect or the optional implementations of the second aspect. Specifically, the network device includes a unit configured to perform the method in any one of the second aspect or the optional implementations of the second aspect.

According to a fifth aspect, this disclosure provides a network device. The network device includes a processor, a network interface, and a memory. The network interface may be a transceiver. The memory may be configured to store program code, and the processor is configured to invoke the program code in the memory to enable the network device to perform the method in any one of the first aspect or the optional implementations of the first aspect. Details are not described herein again.

According to a sixth aspect, this disclosure provides a network device. The network device includes a processor, a network interface, and a memory. The network interface may be a transceiver. The memory may be configured to store program code, and the processor is configured to invoke the program code in the memory to enable the network device to perform the method in any one of the second aspect or the optional implementations of the second aspect. Details are not described herein again.

According to a seventh aspect, this disclosure provides a network system. The network system includes the network device provided in the third aspect and the network device provided in the fourth aspect, or the network system includes the network device provided in the fifth aspect and the network device provided in the sixth aspect.

According to an eighth aspect, this disclosure provides a computer-readable storage medium. The computer-readable storage medium stores instructions. When the instructions are run on a computer, the computer is enabled to perform the methods in the foregoing aspects.

According to a ninth aspect, this disclosure provides a computer program product including computer program instructions. When the computer program product runs on a network device, the network device is enabled to perform the method provided in the first aspect, the second aspect, any optional implementation of the first aspect, or any optional implementation of the second aspect.

According to a ninth aspect, this disclosure provides a chip, including a memory and a processor. The memory is configured to store a computer program, and the processor is configured to invoke the computer program from the memory and run the computer program, to enable the chip to perform the method in any one of the first aspect or the optional implementations of the first aspect. Alternatively, the processor is configured to invoke the computer program from the memory and run the computer program, to enable the chip to perform the method in any one of the second aspect or the optional implementations of the second aspect.

Optionally, the chip includes only a processor. The processor is configured to read and execute a computer program stored in a memory. When the computer program is executed, the chip performs the method in any one of the first aspect or the optional implementations of the first aspect, or the chip performs the method in any one of the second aspect or the optional implementations of the second aspect.

BRIEF DESCRIPTION OF DRAWINGS

To describe technical solutions of this disclosure more clearly, the following briefly describes accompanying drawings used in embodiments. It is clearly that the accompanying drawings in the following description merely show some embodiments of this disclosure, and persons of ordinary skill in the art can derive other technical solutions and accompanying drawings from these accompanying drawings without creative efforts.

FIG. 5A is a schematic diagram of a format of a packet according to an embodiment of this disclosure;

FIG. 5C is a schematic diagram of a format of a packet according to an embodiment of this disclosure;

DESCRIPTION OF EMBODIMENTS

The following describes embodiments of this disclosure with reference to accompanying drawings.

Figure 1:
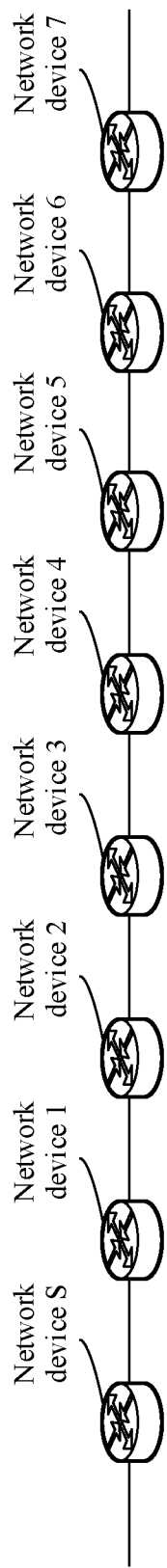
FIG. 1 is a schematic diagram of an application scenario according to an embodiment of this disclosure.

FIG. 1 is an optional application scenario according to an embodiment of this disclosure. The scenario includes an SR network. The SR network includes a network device S, a network device 1, a network device 2, a network device 3, a network device 4, a network device 5, a network device 6, and a network device 7. The network devices may be switches, routers, or forwarders. The network devices may alternatively be virtual machines. The network device S may be a network ingress device. The network may further include a controller, which is not shown in FIG. 1. The controller may generate a SID list corresponding to a forwarding path of a packet, and send the SID list to the network ingress device. The controller may send a control packet including network configuration information to another network device on the network.

Figure 2A:
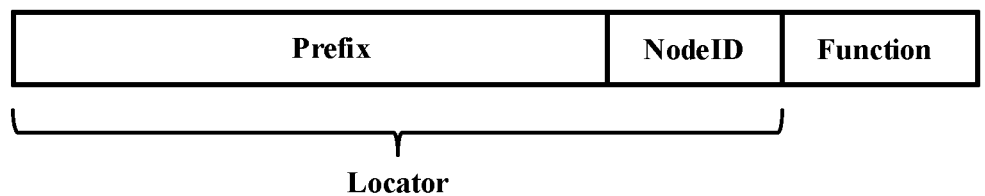
FIG. 2A is a schematic diagram of a format of a segment identifier according to an embodiment of this disclosure.

On the SR network, a packet processing process includes a plurality of segments, and each segment is an instruction or an instruction set for processing a packet. Each segment has a corresponding segment identifier, namely, a SID. The segment identifier includes two types: a node segment identifier (node SID) and an adjacent segment identifier (adjacent SID). FIG. 2A shows a format of a SID on an SRv6 network. As shown in FIG. 2A, each SID may include a locator (Locator) field and a function (Function) field.

The locator field in the SID is used to locate a specific network device that executes an instruction or an instruction set included in a segment. The locator field includes a prefix part and a node ID part. In an SRv6 network domain, prefix parts of SIDs of all network devices are the same. In an SRv6 network domain, a node ID part of a SID of each network device is different, and each node ID part is used to uniquely determine a network device in the domain. For a specific SID, a network device uniquely determined by a node ID part in the SID is a network device that executes a segment identified by the SID.

The function field in the SID is used to indicate specific content of the instruction or the instruction set included in the segment. In other words, the function field is used to indicate a function on the SRv6 network. The function on the SRv6 network may further relate to an argument, and the argument is indicated by using an argument field in the SID (not shown in FIG. 2). When the function does not relate to the argument, the SID may not include the argument field.

Generally, a total length of the SID on the SRv6 network is 128 bits. The locator field and the function field are separately of specific lengths, and the specific lengths may change through network setting. For example, the locator field is 48 bits, and the function field is 80 bits. Alternatively, the locator field is 64 bits, and the function field is 64 bits. Alternatively, the locator field is 48 bits, the function field is 64 bits, and the argument field is 16 bits.

Figure 2B:
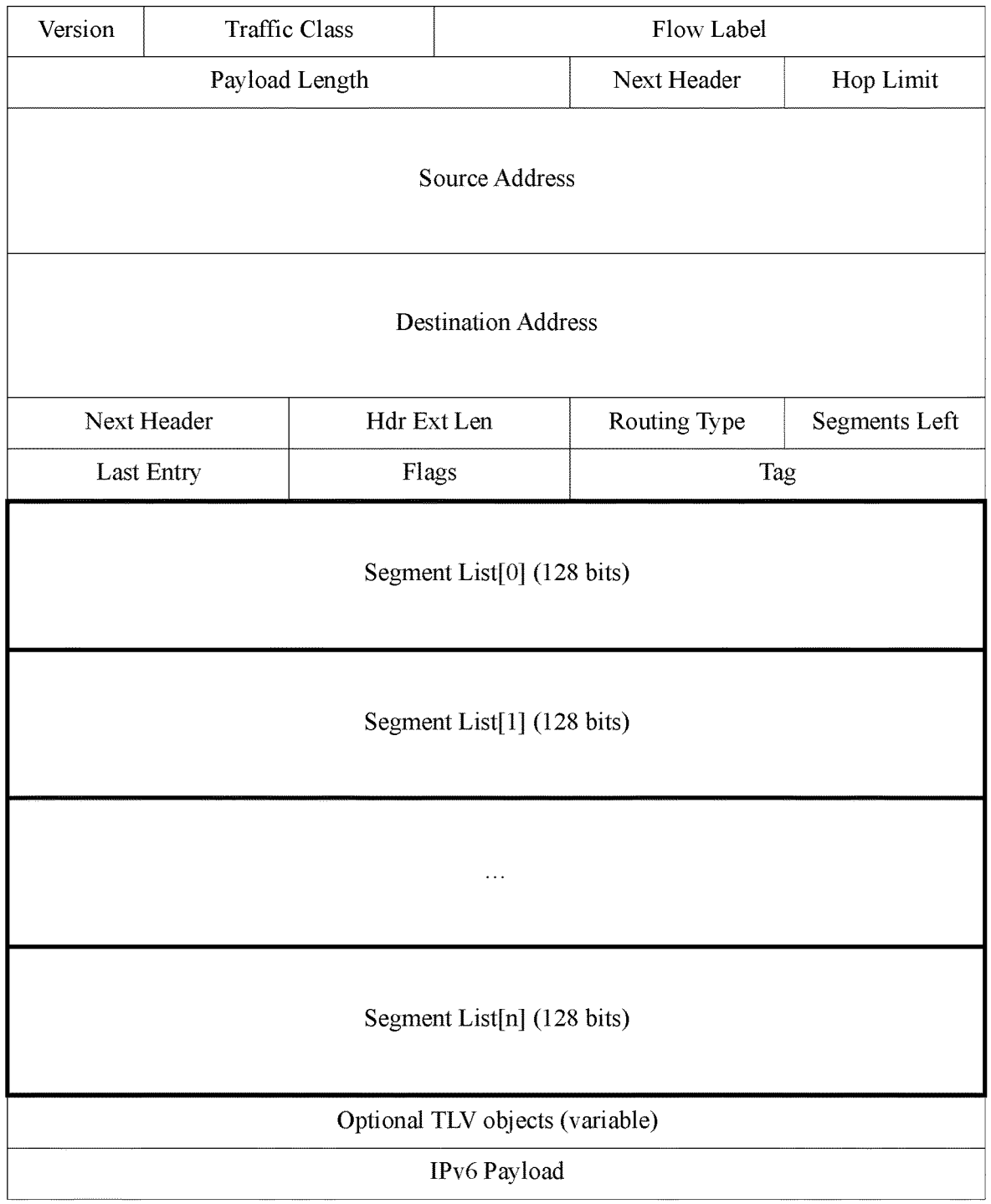
FIG. 2B is a schematic diagram of a format of a packet according to an embodiment of this disclosure.

The SID list includes a plurality of SIDs. FIG. 2B shows a format of a packet on an SRv6 network. As shown in FIG. 2B, a packet header of the packet includes an IPv6 packet header and an SRH. The IPv6 packet header includes a destination address (DA) field. The SRH includes a SID list, and the SID list includes a plurality of sequentially arranged SIDs. The SRH further includes a segment left (SL) pointer, and the SL pointer is used to indicate a quantity of remaining to-be-processed segments. Specifically, each value of the SL pointer corresponds to a specific quantity of remaining to-be-processed segments. For example, when the value of the SL pointer is 3, it indicates that the quantity of remaining to-be-processed segments is 4, and it may also be understood that the SL pointer points to a currently to-be-processed SID, namely, a last but three SID. When the value of the SL pointer is 0, it indicates that the quantity of remaining to-be-processed segments is 1, and it may also be understood that the SL pointer points to a currently to-be-processed SID, namely, a last SID. After determining the currently to-be-processed SID based on the SL pointer, a network device copies the SID to the DA field in the IPv6 packet header, and processes the packet based on content in the DA field, for example, forwards the packet. During packet processing, the value of the SL pointer is updated each time a segment is executed. After each update, a location to which the SL pointer points in the SID list is offset by a length of one SID, namely, 128 bits. As a plurality of segments indicated by using a plurality of SIDs in the SID list are sequentially executed, the value of the SL pointer is continuously updated, to ensure that the SL pointer always points to the currently to-be-processed SID.

With reference to the application scenario shown in FIG. 1, an example is used for description. When a packet may be forwarded by using the SR network shown in FIG. 1, a forwarding path of the packet is that the network device S sends the packet to the network device 1, and the packet arrives at the network device 7 after successively passing through the network device 2, the network device 3, the network device 4, the network device 5, and the network device 6. In addition to a head node, namely, the network device S, the forwarding path further includes a total of 7 network devices, namely, the network device 1 to the network device 7. Each network device forwards the packet. For example, forwarding processing behavior at each network device corresponds to one segment. In this way, a SID list indicating an entire packet forwarding process includes seven SIDs. A length of each SID is 128 bits, and a length of the SID list is 112 bytes. As a result, a packet length is increased, and transmission efficiency and processing efficiency of the network are reduced.

An embodiment of this disclosure provides a packet processing method, and a device and a system that are based on the method. The method, the device, and the system are based on a same inventive concept. Principles of resolving problems by the method, the device, and the system are similar. Therefore, for the embodiments of the method, the device, and the system, refer to each other, and same or similar content is not described again.

Figure 3:
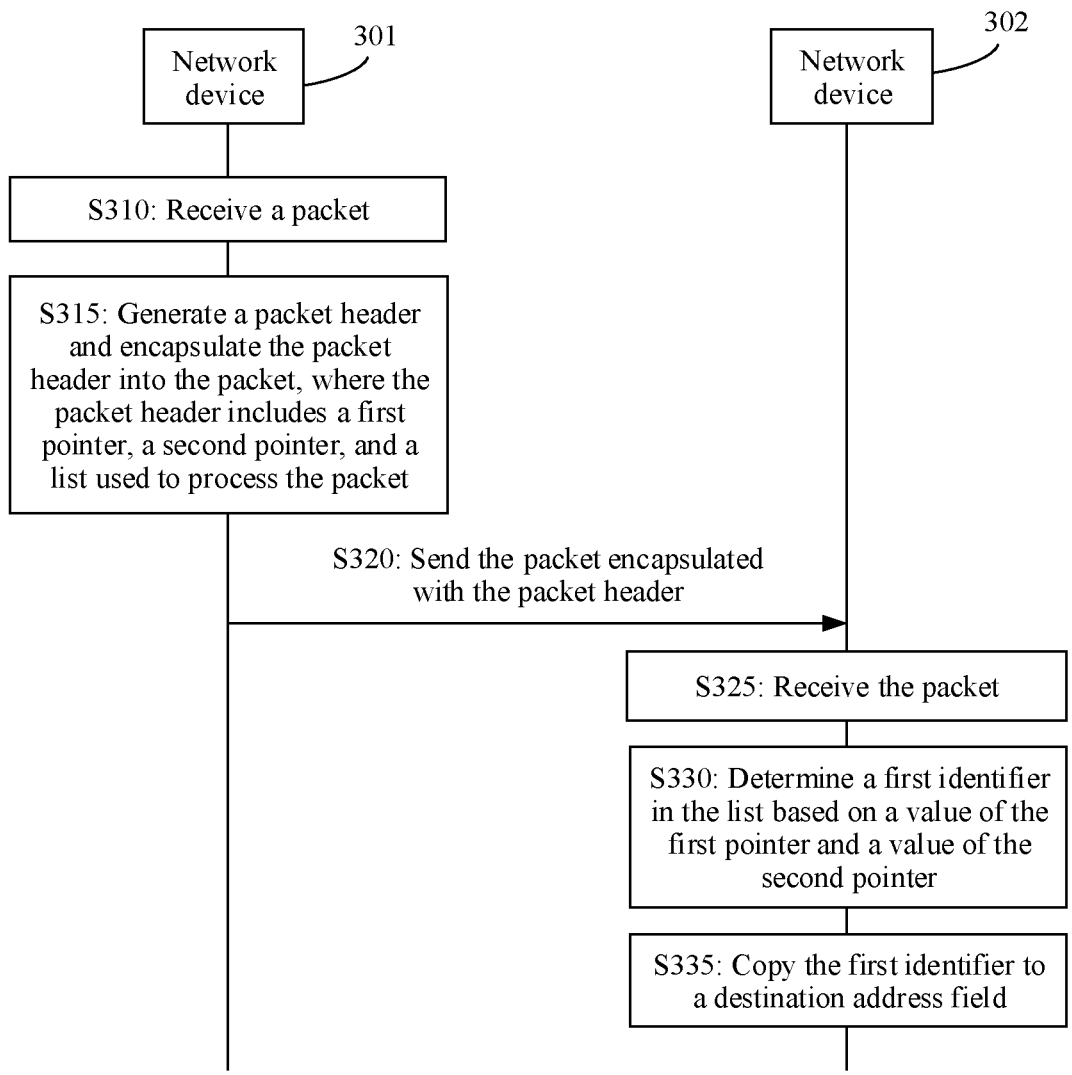
FIG. 3 is a schematic flowchart of a packet processing method according to an embodiment of this disclosure.

An embodiment of the present invention provides a packet processing method. The method is applied to an SR network, and relates to a network device 301 and a network device 302. The network device 301 may be a network ingress device, for example, the network device S shown in FIG. 1, and is configured to encapsulate a SID list in a packet. The network device 302 may be a forwarding device, for example, the network device 1, the network device 2, the network device 3, the network device 4, the network device 5, the network device 6, or the network device 7 shown in FIG. 1, in a network, and is configured to process the packet based on the SID list. In the method, when the SID list is generated, a compressed segment identifier (C-SID) is used to replace a SID whose length is 128 bits to indicate a segment. A CL pointer is set in a packet header to jointly form a two-dimensional pointer with an SL pointer, to indicate a location of the C-SID in the SID list. Therefore, for two segments in which a quantity of C-SIDs of one segment is the same as a quantity of SIDs of the other segment, a length of a SID list including the C-SID is far less than a length of a SID list including the SID. Therefore, a packet length is reduced, and transmission efficiency and processing efficiency of the network are improved. FIG. 3 shows a procedure of the method, and the method specifically includes the following steps.

S310: The network device 301 receives a packet.

As the network ingress device, the network device 301 may receive the packet sent by a host. The packet may be a service packet. The host may be a terminal device, for example, a personal computer, a mobile phone, or a tablet computer.

S315: The network device 301 generates a packet header and encapsulates the packet header into the packet, where the packet header includes a first pointer, a second pointer, and a list used to process the packet. The list includes a plurality of sequentially arranged identifiers, the plurality of identifiers are one-to-one mapped to a plurality of segments on the SR network, and a value of the first pointer and a value of the second pointer jointly indicate a location of a first identifier in the plurality of identifiers in the list.

On the SRv6 network, the packet header includes an IPv6 packet header and an SRH, and the list is a SID list in the SRH. For the received packet, the network device 301 generates the packet header including the SID list, and encapsulates the packet header into the received packet, to process the packet.

Figure 4A:
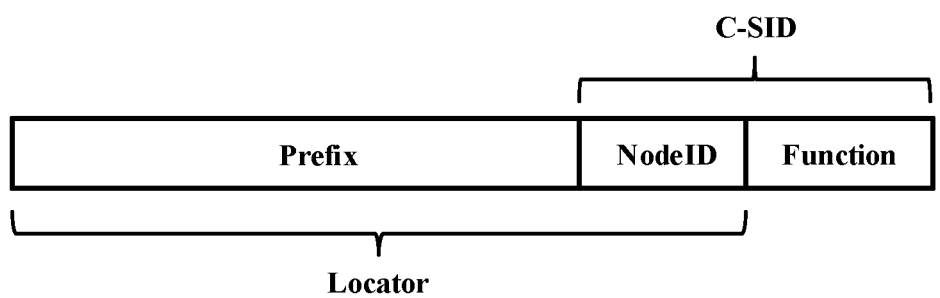
FIG. 4A is a schematic diagram of a format of a compressed segment identifier according to an embodiment of this disclosure.

On the SR network, each segment used to process the packet has a specific segment identifier, namely, a SID. In other words, the plurality of segments used to process the packet are one-to-one mapped to a plurality of SIDs. With reference to the foregoing description, each SID may include a locator field and a function field, and the locator field includes a prefix part and a node ID part. A sum of lengths of the locator field and the function field may be 128 bits. In an SRv6 network domain, prefix parts of SIDs of all network devices are the same. A node ID part of a SID of each network device is different, and each node ID part is used to uniquely determine a network device in the domain. In other words, each SID may be divided into two parts. A first part includes the prefix part, and a second part includes the node ID part and the function field. First parts of all SIDs are the same. However, the second part of each SID is different. A sum of lengths of the first part and the second part is 128 bits. Therefore, to reduce a length of the SID list, the first part may be omitted. In other words, the prefix part of the locator field in the SID is omitted. As shown in FIG. 4A, the second part, namely, the node ID part and the function field, may be used as a compressed segment identifier, namely, a C-SID. Therefore, the SID list includes a plurality of sequentially arranged C-SIDs, and each C-SID is mapped to one segment on the SR network.

With reference to the disclosure scenario shown in FIG. 1, a SID of the network device 1 may be A1:0001:1111, a length of the SID is 128 bits, and "::" indicates all 0 bytes. A1::0001 is a locator field whose length is 112 bits, A1/96 is a prefix part, "/96" indicates a 96-bit mask, and 0001 is a node ID part whose length is 16 bits. 1111 is a function field whose length is 16 bits. A first part in the SID is A1, and a second part in the SID is 0001:1111. The second part is used as a C-SID. In other words, the C-SID is 0001:1111 whose length is 32 bits.

Similarly, SIDs of the network device 2, the network device 3, the network device 4, the network device 5, the network device 6, or the network device 7 may respectively be: A1::0002:2222, A1::0003:3333, A1::0004:4444, A1::0005:5555, A1::0006:6666, and A1::0007:7777. C-SIDs of the network devices may be: 0002:2222, 0003:3333, 0004:4444, 0005:5555, 0006:6666, and 0007:7777. A length of each C-SID is 32 bits.

With reference to the foregoing description, the C-SID includes the node ID part and the function field in the SID. The length of the C-SID is determined by a sum of lengths of the node ID part and the function field in the SID. Specifically, the length of the C-SID is the same as the sum of the lengths of the node ID part and the function field in the SID. For example, the length of the C-SID may be 32 bits, or the length of the C-SID may be 16 bits.

Optionally, in a network planning process, each SID may be divided into three parts. A first part includes the prefix part, a second part includes the node ID part and the function field, and a third part is padding content. Third parts of all SIDs are the same and are filled with same content, for example, all 0s. A sum of lengths of the first part, the second part, and the third part is 128 bits. Therefore, a sum of lengths of the first part and the second part is less than 128 bits. As shown in FIG. 4D, when the C-SID is generated by using the SID, the first part and the third part are omitted, and the second part is still used as the C-SID. With reference to the application scenario shown in FIG. 1, a SID of the network device 1 may be A1::0001:1111::, a length of the SID is 128 bits, and "::" indicates all 0 bytes. A1::0001 is a locator field whose length is 64 bits, A1/48 is a prefix part, "/48" indicates a 48-bit mask, and 0001 is a node ID part whose length is 16 bits. 1111 is a function field whose length is 16 bits. In other words, a first part in the SID includes A1 whose length is 48 bits, a second part in the SID includes 0001:1111 whose length is 32 bits, and a third part includes an all-0 part whose length is 48 bits. The second part is used as a C-SID. In other words, the C-SID is 0001:1111 whose length is 32 bits. In actual network application, some devices may not be able to process 128-bit data at a time. For example, some ASIC chips can process only 80-bit data at a time. In this case, in a network planning process, each SID is set to include padding content in the third part. In a network processing process, a third part in a DA field may not be processed. Only a first part and a second part are processed, so that a length of data that needs to be processed is reduced, and an adaptation range of the network device is extended.

Figure 4B:
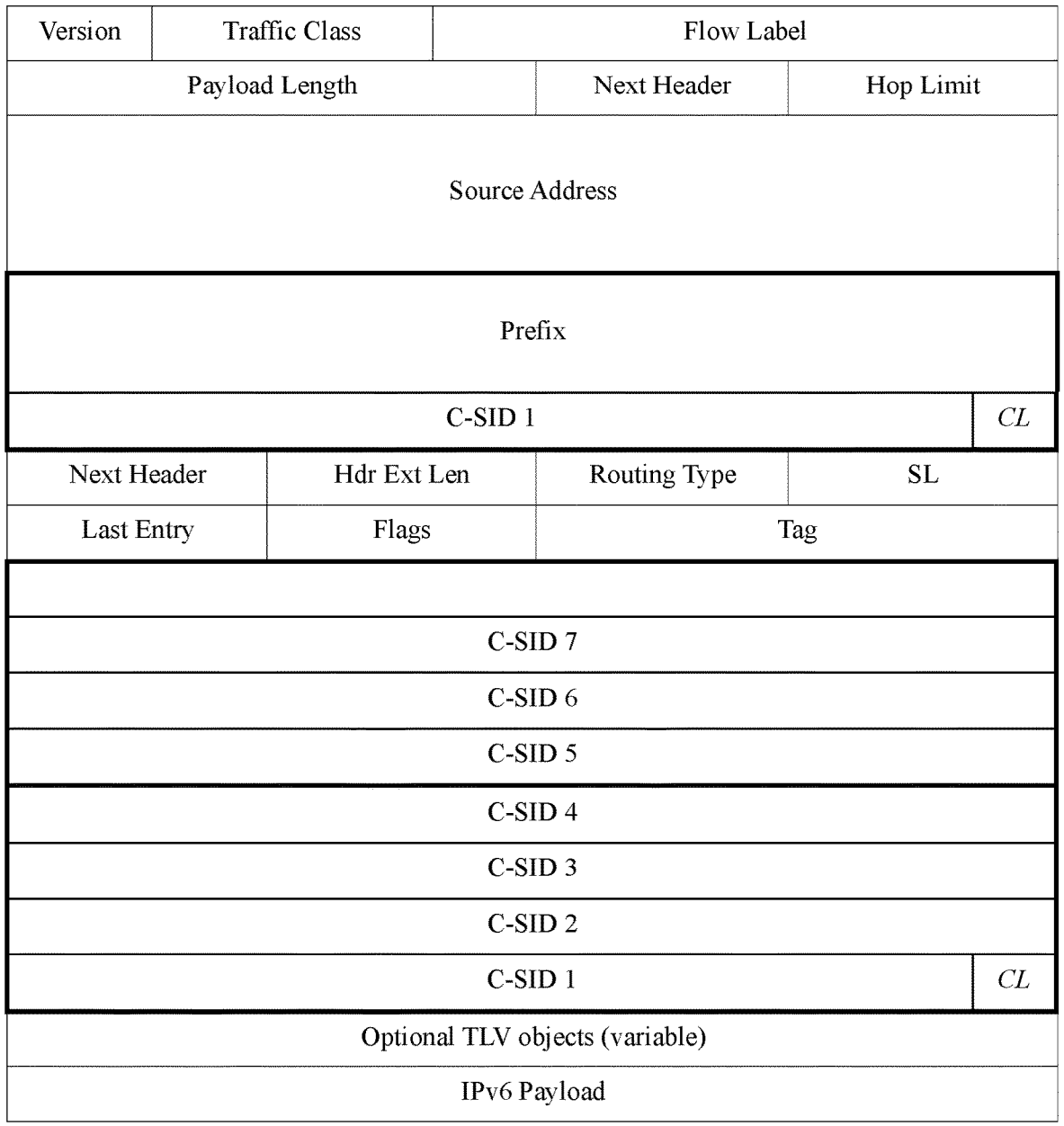
FIG. 4B is a schematic diagram of a format of a packet according to an embodiment of this disclosure.

FIG. 4B shows a structure of a packet encapsulated with a packet header. The packet header includes an IPv6 packet header and an SRH, and the SRH includes a SID list. With reference to the application scenario shown in FIG. 1, when a forwarding path of the packet is that the network device S sends the packet to the network device 1, and the packet arrives at the network device 7 after successively passing through the network device 2, the network device 3, the network device 4, the network device 5, and the network device 6. A SID list corresponding to the forwarding path may be shown in FIG. 4B, including seven C-SIDs. A length of each C-SID is 32 bits, and a length of the seven C-SIDs is 224 bits. A length of the SID list is greatly reduced. This improves transmission efficiency and processing efficiency of a network.

The C-SID of each network device may be advertised by using an extended control plane protocol. A prefix part of a SID in an SRv6 network domain can also be advertised by using the extended control plane protocol. The control plane protocol may be, for example, an interior gateway protocol (IGP), a border gateway protocol (BGP), a border gateway protocol link state (BGP-LS), or a path computation element communication protocol (PCEP).

The SID list including the C-SID may be generated by the controller, or may be generated by the network ingress device. For example, the controller obtains the forwarding path of the packet through calculation, and generates the SID list corresponding to the forwarding path. The SID list includes the C-SID, and the controller sends the SID list to the network ingress device. Alternatively, the network ingress device obtains the forwarding path of the packet through calculation, and generates the SID list corresponding to the forwarding path. The SID list includes the C-SID. Alternatively, the controller obtains the forwarding path of the packet through calculation, and generates the SID list corresponding to the forwarding path. The SID list includes the SID but does not include the C-SID, and the controller sends the SID list to the network ingress device. The network ingress device generates a new SID list based on the received SID list. The new SID list includes the C-SID.

A control plane protocol used to send the SID list may be, for example, a border gateway protocol (BGP) or a path computation element communication protocol (PCEP). The control plane protocol may be extended to send the SID list including the C-SID. A new attribute of the control plane protocol may be extended to identify that the SID list including the SID may be converted into the SID list including the C-SID, or that the SID list including the SID should be converted into the SID list including the C-SID. For example, after obtaining the forwarding path of the packet through calculation, the controller generates the SID list corresponding to the forwarding path. The SID list includes the SID but does not include the C-SID, and the controller sends the SID list to the network ingress device. The extended new attribute of the control plane protocol is used to identify that the SID list may be converted into the SID list including the C-SID. The network ingress device generates, based on indication of the attribute, a new SID list based on the received SID list. The new SID list includes the C-SID.

Optionally, the network device 301 may advertise a capability attribute of the network device 301 to another network device by using a control plane protocol. The capability attribute is used to indicate that the network device 301 can be compatible with a C-SID, for example, advertise a C-SID mapped to a segment, generate a SID list including the C-SID, encapsulate the SID list including the C-SID into a packet, and process the packet based on the C-SID. The control plane protocol may be, for example, an interior gateway protocol (IGP), a border gateway protocol (BGP), or a path computation element communication protocol (PCEP). In an example, the network device 301 adds the omitted first part in the SID to the DA field. With reference to the foregoing analysis, the plurality of C-SIDs in the SID list are one-to-one mapped to the plurality of segments. Further, the plurality of segments are one-to-one mapped to the plurality of SIDs. To reduce the length of the SID list, the first part in the SID is omitted, that is, the prefix part of the locator field in the SID is omitted. Only the second part in the SID, namely, the node ID part and the function field, is used as the C-SID and stored in the SID list. Optionally, the SID list may include only the C-SID, but does not include the prefix part corresponding to the C-SID. The network device 301 adds the first part in the SID, namely, the prefix part of the locator field, to the destination address field, and the network device 301 copies, to the DA field, a currently to-be-processed C-SID in the plurality of C-SIDs in the SID list. The first part in the DA field and the currently to-be-processed C-SID form the currently to-be-processed SID, so that the network device may still process the packet based on content in the DA field. For example, refer to FIG. 4B. The network device 301 copies a first C-SID in the plurality of C-SIDs, namely, a C-SID 1, to the DA field. The prefix part in the DA field and the C-SID 1 form a first SID in the plurality of SIDs. The network device 301 processes the packet based on the first SID, for example, forwards the packet.

When the SID on the network includes the third part including the padding content, the network device 301 further adds the omitted third part in the SID to the DA field. In addition, the first part, the second part, and the third part are sequentially arranged in the DA field based on locations of the first part, the second part, and the third part in the SID. Therefore, the network device 301 adds the first part to the beginning of the DA field. A first bit of the first part is aligned with a first bit of the DA field. The network device 301 adds the third part to the end of the DA field. A last bit of the third part is aligned with a last bit of the DA field. The first part in the DA field, the currently to-be-processed C-SID, and the third part form the currently to-be-processed SID. Therefore, when receiving the packet, a subsequent network device on the packet forwarding path may still process the packet based on the content in the DA field. Optionally, when the SID on the network includes the third part including the padding content, the network device 301 or the controller on the network may advertise structure information of the DA field to another network device by using a control plane protocol, so that the another network device can correctly parse the content in the DA field. The structure information indicates an addition location of the C-SID in the DA field. In other words, the structure information indicates an addition location of the second part in the SID in the DA field. With reference to the foregoing description, the first part, the second part, and the third part are sequentially arranged in the DA field based on the locations of the first part, the second part, and the third part in the SID, and the structure information indicates the location of the second part in the SID in the SID. For example, the structure information may include a length of the first part and a length of the second part. In other words, a length of the prefix part and the length of the C-SID are advertised. Alternatively, the structure information may include a length of the first part and a length of the third part, or the structure information may include a length of the first part, a length of the second part, a length of the third part, or the like. The control plane protocol used to notify the structure information may be an intermediate system to intermediate system (IS-IS) protocol, an open shortest path first (OSPF) protocol, a border gateway protocol (BGP) protocol, or the like. For a specific process in which the another network device parses the content in the DA field, refer to the following description.

With reference to the foregoing description, the SRH includes the SL pointer used to indicate the quantity of remaining to-be-processed segments. After each update, a location to which the SL pointer points in the SID list is offset by a length of one SID, namely, 128 bits. When the C-SID is used, because the length of the C-SID is less than the length of the SID, original space for storing one SID can store a plurality of C-SIDs. Therefore, after each update, a location to which the SL pointer points in the SID list is offset by lengths of the plurality of C-SIDs, and each C-SID cannot be accurately located.

In this embodiment of this disclosure, space in the SID list is divided into a plurality of elements, and after each update, the SL pointer points to a different element. Further, a new pointer may be set to determine a currently to-be-processed C-SID in each element. The new pointer may be referred to as the CL pointer, and the CL pointer and the SL pointer form the two-dimensional pointer. A value of the SL pointer is used to determine a location of a currently to-be-processed element in the SID list, and a value of the CL pointer is used to determine a location of the currently to-be-processed C-SID in the element. Therefore, a location of the currently to-be-processed C-SID in the SID list may be determined based on the value of the SL pointer and the value of the CL pointer. In other words, the value of the SL pointer and the value of the CL pointer jointly indicate the location of the C-SID in the SID list.

In an example, space occupied by each SID may be divided into one element. To be specific, a length of each element is 128 bits, and after each update, the location to which the SL pointer points in the SID list is still offset by 128 bits. Refer to the SID list in the packet header of the packet shown in FIG. 4B, a first element in the SID list includes four C-SIDs, and a second element includes three C-SIDs. Therefore, the seven C-SIDs occupy two elements in the SID list in total.

Along with behavior of copying, by the network device, the C-SID in the SID list to the DA field, the value of the CL pointer also needs to be updated, to ensure that the value of the CL pointer is always used to determine the location of the currently to-be-processed C-SID in the element.

A manner in which the CL pointer is updated is associated with an initial value of the CL pointer. As shown in FIG. 4B, when the first element in the SID list includes four C-SIDs, the initial value of the CL pointer may be 0, and is used to indicate a first C-SID in the element. The value of the CL pointer is increased by 1 at each update. To be specific, the value of the CL pointer is sequentially updated to 1, 2, and 3, and is sequentially used to indicate a second C-SID, a third C-SID, and a fourth C-SID in the element. Similarly, if the initial value of the CL pointer is 3, and is used to indicate a first C-SID in the element, the value of the CL pointer is reduced by 1 at each update. To be specific, the value of the CL pointer is sequentially updated to 2, 1, and 0, and is sequentially used to indicate a second C-SID, a third C-SID, and a fourth C-SID in the element.

There are two execution sequences between an action in which the value of the CL pointer is updated and an action in which the C-SID is copied to the DA field. The first sequence is that the value of the CL pointer is updated, and then the C-SID is copied. The second sequence is that the C-SID is copied, and then the value of the CL pointer is updated. The foregoing two execution sequences may be selected through network settings. After an execution sequence is selected, all network devices on the network perform the foregoing two actions according to the execution sequence, to ensure that the value of the CL pointer is always used to determine the location of the currently to-be-processed C-SID in the element.

Figure 4C:
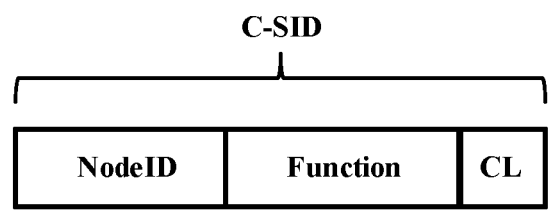
FIG. 4C is a schematic diagram of a format of a compressed segment identifier according to an embodiment of this disclosure.
Figure 4D:
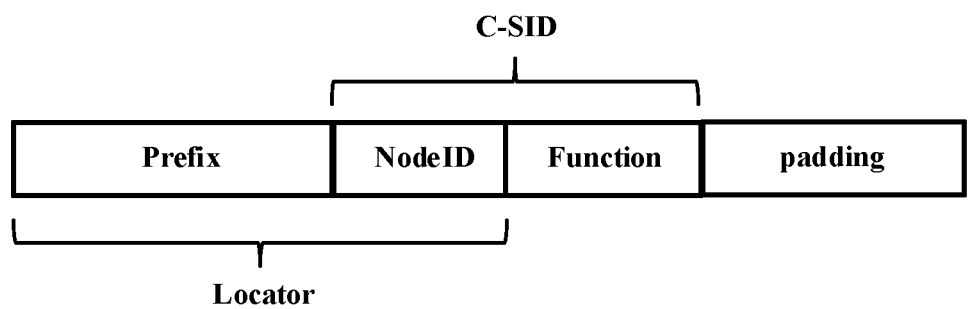
FIG. 4D is a schematic diagram of a format of a compressed segment identifier according to an embodiment of this disclosure.

The CL pointer has a specific location in the packet header. In an example, the CL pointer may be included in the C-SID. FIG. 4C shows a structure of the C-SID. Refer to FIG. 4C. A last part of fields in the C-SID may be divided and used as a candidate field of the CL pointer. The candidate field may be set to a specific length, for example, 3 bits. A value of the candidate field may be set to a specific initial value, for example, set to all 0s. When there are a plurality of sequentially arranged C-SIDs in the SID list, a candidate field in a specific C-SID may be selected, as the CL pointer, from each element in the SID list. A value of the candidate field in the specific C-SID is used to determine a location of the currently to-be-processed C-SID in the element. A value of a candidate field of another C-SID in the element remains as an initial value. Preferably, the specific C-SID is a C-SID at an edge in each element. For example, the specific C-SID may be a first C-SID, namely, the C-SID 1 shown in FIG. 4B, in the element, and include the CL pointer. Italic fonts indicate that this is an optional implementation. A candidate field of the first C-SID is used as the CL pointer, and the value of the CL pointer is modified based on the location of the currently to-be-processed C-SID in the element. A value of a candidate field of another C-SID in the element remains as the initial value, for example, is still all 0s. For example, the specific C-SID may alternatively be a last C-SID in the element.

In an example, the CL pointer may be a field obtained from the SRH through division. This is not shown in FIG. 4B. For example, the CL pointer may be a part obtained from a flags field, a last entry field, or a tag field through division. The CL pointer may be set to a specific length, for example, 3 bits.

In an example, the CL pointer may be a part obtained from the DA field in the IPv6 packet header through division. Specifically, the CL pointer is located in a last part of the DA field, namely, a last part of the C-SID in the DA field. As shown in FIG. 4B, italic fonts indicate that this is an optional implementation. The CL pointer may be set to a specific length, for example, 3 bits. The value of the CL pointer in the DA field is modified based on the location of the currently to-be-processed C-SID in the element. In this case, a format of the C-SID still includes the foregoing candidate field, and the length of the candidate field is the same as the length of the CL pointer. However, initial values of candidate fields of all C-SIDs in the SID list remain unchanged.

With reference to the foregoing description, the network device 301 may advertise the another network device that the network device 301 can process the C-SID. On the network, some network devices cannot be compatible with the C-SID. When a network device that cannot be compatible with the C-SID is located in the forwarding path of the packet, the network device also processes the packet based on a segment. The network device cannot be compatible with the C-SID, and does not advertise a C-SID mapped to a segment, but only advertises a SID mapped to a segment. Therefore, a SID list corresponding to the forwarding path includes the SID mapped to the segment. When the forwarding path further passes through the network device compatible with the C-SID, the SID list corresponding to the forwarding path includes both the C-SID and the SID.

FIG. 5A shows a structure of a packet encapsulated with a packet header. The packet header includes an IPv6 packet header and an SRH, the SRH includes a SID list, and the SID list includes both a C-SID and a SID. Specifically, the SID list may include the SID before the C-SID, may include the SID after the C-SID, or may include both the SID before the C-SID and the SID after the C-SID. The C-SID may refer to a plurality of C-SIDs, and the SID before or after the C-SID may refer to a plurality of SIDs. A corresponding actual network situation is as follows. A forwarding path of the packet may first pass through a network domain incompatible with the C-SID before passing through a network domain compatible with the C-SID; may pass through a network domain incompatible with the C-SID after passing through a network domain compatible with the C-SID; or may first pass through a network domain incompatible with the C-SID before passing through a network domain compatible with the C-SID, and then pass through a network domain incompatible with the C-SID after passing through the network domain compatible with the C-SID. The network domain compatible with the C-SID may include a plurality of network devices, and network domain incompatible with the C-SID may also include a plurality of network devices.

With reference to the application scenario shown in FIG. 1, in addition to the network device 1 to the network device 7, the forwarding path of the packet may further pass through other network devices that cannot be compatible with the C-SID. The network devices that cannot be compatible with the C-SID may be located between the network device S and the network device 1, and are located after the network device 7. This is not shown in FIG. 1.

When the SID list includes both the C-SID and the SID, the SID list may still be sent by using the foregoing extended control plane protocol.

When the SID list includes both the C-SID and the SID, a start indication may be set in the packet header to indicate a start of the C-SID.

In an example, C-SIDs in the SID list are used to indicate segments executed by all network devices that can be compatible with the C-SID, and the start indication may be included in a last SID before a first C-SID. For example, the start indication may be a specific function on an SRv6 network, and is stored in a function field of the last SID.

Figure 5B:
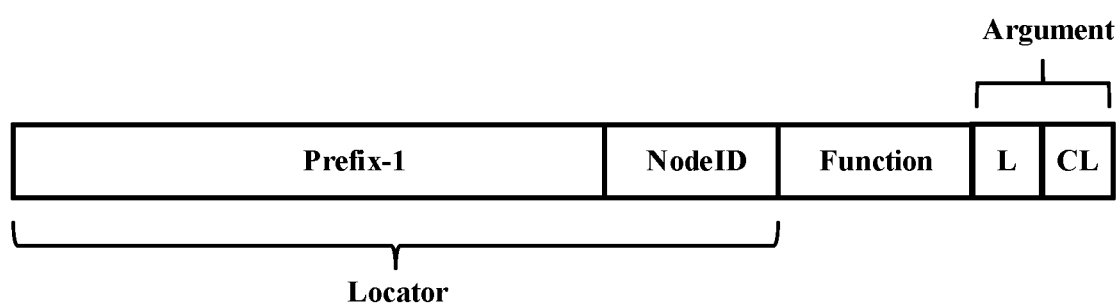
FIG. 5B is a schematic diagram of a format of a compressed segment identifier according to an embodiment of this disclosure.

In an example, in the segments executed by the all network devices that can be compatible with the C-SID, a first segment is still indicated in the SID list by using a SID whose length is 128 bits, and the remaining segments are indicated by using C-SIDs. The start indication may be included in a SID to which the first segment maps, and the SID may also be referred to as a special SID. FIG. 5B shows a format of the special SID. The SID includes a locator field, a function field, and an argument field, namely, Locator, Function, and Argument. The locator field includes a prefix part and a node ID part, namely, Prefix-1 and NodeID. In addition, Prefix-1 is different from a prefix in a SID to which a C-SID is mapped. The argument field includes a quantity indication and a CL pointer. The quantity indication is indicated by using L. FIG. 5C shows a packet including the special SID in the SID list. SPECIAL SID is the special SID.

When the special SID is used, space occupied by the C-SID may be divided into one element, and a length of the element may be greater than 128 bits. Space occupied by each remaining SID is divided into one element, and a length of the element is 128 bits. Therefore, lengths of all space may not be the same, and lengths offset by locations pointed to by an SL pointer in the SID list after each update are also not necessarily the same. Refer to the SID list in the packet header of the packet shown in FIG. 5A, an element, in the SID list, that includes all C-SIDs includes seven C-SIDs, and a length of the element is greater than 128 bits.

The CL pointer in the special SID is used to determine a currently to-be-processed C-SID from the element including the C-SID. Along with behavior of copying, by a network device, the C-SID in the SID list to a DA field, a value of the CL pointer is updated, to ensure that the value of the CL pointer is always used to determine a location of the currently to-be-processed C-SID in the element. With reference to the packet shown in FIG. 5C, the value of the CL pointer in the special SID may be seven different values, for example, 0 to 6.

A value of the quantity indication is used to indicate a quantity of all C-SIDs. The value of the quantity indication is used to determine, when the plurality of C-SIDs end, a length that is offset when the SL pointer is updated. With reference to the packet shown in FIG. 5C, when the plurality of C-SIDs end, the length that is offset and that is of the SL pointer may be 224 bits, to point to a first SID after the plurality of C-SIDs.

In an example, a value of the function field in the special SID is used to indicate a specific function on the SRv6 network, and the quantity indication and the CL pointer are used as arguments of the specific function. The specific function is used to: when the value of the CL pointer is an initial value, that is, when the plurality of C-SIDs in the SID list start, copy the prefix part, namely, the foregoing prefix, of the SID to which the C-SID is mapped to the DA field; and copy a first C-SID in the plurality of C-SIDs to the DA field.

In an example, the network device 301 may obtain SIDs and C-SIDs for a same segment, including the foregoing special SID. The SIDs and C-SIDs may be advertised by a network device executing the segment. When the SID list is generated, in a plurality of segments that can be indicated by the C-SID, instead of the C-SID, the special SID should be used as a first segment.

When the SID list includes both the C-SID and the SID, an end indication may be further set in the packet header to indicate an end of the C-SID. The network device may determine a last C-SID in the plurality of C-SIDs based on the end indication, and copy 128 bits after the last C-SID to the DA field, that is, copy a SID after the last C-SID to the DA field.

In an example, in the SID list, one end indication is set after the plurality of C-SIDs, to indicate an end of the plurality of C-SIDs. The end indication may be a type field whose length is the same as the length of the C-SID, and a value of the end indication is a specific value, for example, all 0s. As shown in FIG. 5A, the end indication may be indicated by EOC. Italic fonts indicate that this is an optional implementation.

In an example, in the SID list, one end indication is set in the last C-SID in the plurality of C-SIDs, to indicate an end of the plurality of C-SIDs. As shown in FIG. 5A, the end indication may be included in a C-SID 7.

Optionally, the end indication may be a specific function in the SRv6 network, and is stored in a function field of the last C-SID.

Figure 5D:
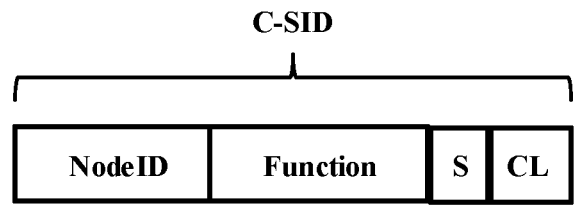
FIG. 5D is a schematic diagram of a format of a compressed segment identifier according to an embodiment of this disclosure.

Optionally, the end indication may be a specific field in the C-SID. With reference to the foregoing description, a last part of fields in the C-SID may be divided and used as a candidate field of the CL pointer. On this basis, some fields before the candidate field of the CL pointer may be divided as candidate fields of the end indication. FIG. 5D shows a format of a C-SID including a candidate field of an end indication and a candidate field of a CL pointer. The candidate field of the end indication is indicated by using S. The candidate field of the end indication may be set to a specific length, for example, 1 bit. A value of the candidate field of the end indication may be set to a specific initial value, for example, set to 0. A value of a candidate field of an end indication in a last C-SID in a SID list is set to 1. This indicates an end of the C-SID. A value of a candidate field of an end indication in a remaining C-SID remains as an initial value. A manner in which the CL pointer is updated is the same as the previously described manner. Details are not described herein again.

In an example, the network device 301 may obtain C-SIDs of different formats for a same segment, including the format of the C-SID including the candidate field of the end indication and the candidate field of the CL pointer. The C-SIDs of different formats may be advertised by a network device executing the segment. The format of the C-SID including the candidate field of the end indication and the candidate field of the CL pointer may be selected for a last C-SID in each element in the SID list. The candidate field of the CL pointer may be used as the CL pointer, and is used to determine a currently to-be-processed C-SID in the element. When the last C-SID in the element is a last C-SID in all C-SIDs at the same time, an end indication in the last C-SID may be used to indicate an end of the C-SID.

S320: The network device 301 sends the packet encapsulated with the packet header.

With reference to the foregoing description, the network device 301 copies the first C-SID in the SID list to the DA field. The first part of the SID and the first C-SID that are in the DA field re-form a SID. The network device 301 sends the packet encapsulated with the packet header. Optionally, the network device 301 processes the packet based on an SRv6 network function indicated by the function field in the SID, and a processing process is determined by a specific instruction in the SRv6 network function. Optionally, the processing process may include sending the packet. For example, the network device 301 sends the packet to the network device 302.

S325: The network device 302 receives the packet. The packet header of the packet includes the destination address field, the first pointer, the second pointer, and the list used to process the packet. The list includes the plurality of sequentially arranged identifiers, the plurality of identifiers are one-to-one mapped to the plurality of segments on the SR network, and the value of the first pointer and the value of the second pointer jointly indicate the location of the first identifier in the plurality of identifiers in the list.

S330: The network device 302 determines the first identifier based on the value of the first pointer and the value of the second pointer.

S335: The network device 302 copies the first identifier to the destination address field.

The network device 302 receives the SID list including the C-SID, determines the currently to-be-processed C-SID based on the SL pointer and the CL pointer, and copies the C-SID to the DA field. The C-SID may overwrite an original C-SID in the DA field, and form a SID with the prefix part in the DA field. The subsequent network device on the packet forwarding path may process the packet based on the SID.

When the SID on the network includes the third part including the padding content, the network device 302 learns, based on the structure information, of the SID, advertised by the network device 301 or the controller on the network, the specific location of the second part in the DA field. Therefore, the network device 302 may copy the currently to-be-processed C-SID to the corresponding location of the second part in the DA field based on the specific location of the second part in the DA field, so that the C-SID overwrites the original C-SID in the DA field. In other words, the network device 302 updates the second part in the DA field, but does not update the first part and the third part in the DA field. The updated second part is combined with the first part and the third part to form a SID. The subsequent network device on the packet forwarding path may process the packet based on the SID. With reference to the foregoing description, there are the two execution sequences between the action in which the value of the CL pointer is updated and the action in which the C-SID is copied to the DA field. In relation to this, there are also two execution manners for determining, at the network device 302, the currently to-be-processed C-SID based on the SL pointer and the CL pointer. In addition, space including the C-SID in the SID list may be divided into a plurality of elements, or may be divided into one element. In relation to this, at the network device 302, there are also different execution manners for determining the currently to-be-processed C-SID based on the SL pointer and the CL pointer.

When the execution sequence is that the value of the CL pointer is first updated and then the C-SID is copied, and the space including the C-SID in the SID list may be divided into the plurality of elements, an example is used for description with reference to the application scenario shown in FIG. 1. The network device 302 may be the network device 1 in FIG. 1. The network device 1 receives a packet sent by the network device S. A packet header of the packet is shown in FIG. 4. The packet header includes a DA field, an SL pointer, a CL pointer, and a SID list, and the SID list includes a plurality of C-SIDs. In this case, the DA field includes a prefix part and a C-SID 1. The prefix part is A1, the C-SID 1 is 0001:1111, and a combination of the prefix part and the C-SID 1 is A1:0001:1111, namely, the SID of the network device 1. In this case, a value of the SL pointer in the packet header is 1, indicating a location of a first element in the SID list. Refer to FIG. 4, the first element includes four C-SIDs, which are: the C-SID 1, a C-SID 2, a C-SID 3, and a C-SID 4. A value of the CL pointer in the packet header is 1, indicating a location of a first C-SID in a container in the element, namely, the C-SID 1. The network device 1 first updates the value of the CL pointer, for example, modifies the value of the CL pointer to 2, to indicate a location of a second C-SID in the container in the element. The network device 1 obtains a second C-SID, namely, the C-SID 2, in the first element based on indications of the SL pointer and the CL pointer, and copies the C-SID 2 to the DA field in the packet header to replace the original C-SID 1 in the DA field. In this case, the DA field includes a combination of the prefix part and the C-SID 2, namely, A1:0002:2222, which is a SID of the network device 2. The network device 1 queries a forwarding entry based on the SID of the network device 2 in the DA field, and sends the packet to the network device 2 based on a query result.

Alternatively, the network device 302 may be the network device 2 in FIG. 1. The network device 2 receives a packet sent by the network device 1. In this case, a DA field in a packet header of the packet includes a prefix part and a C-SID 2, namely, A1:0002:2222, which is a SID of the network device 2. In the packet header, a value of an SL pointer is 1, and a value of a CL pointer is 2. This indicates a location of a second C-SID, namely, the C-SID 2, in a first element. The network device 2 first updates the value of the CL pointer, for example, modifies the value of the CL pointer to 3, to indicate a location of a third C-SID in a container in the element. The network device 2 obtains a third C-SID, namely, a C-SID 3, in the first element based on indications of the SL pointer and the CL pointer, and copies the C-SID 3 to the DA field in the packet header to replace the original C-SID 2 in the DA field. In this case, the DA field includes a combination of the prefix part and the C-SID 3, namely, A1:0003:3333, which is a SID of the network device 3. The network device 2 queries a forwarding entry based on the SID of the network device 3 in the DA field, and sends the packet to the network device 3 based on a query result.

Alternatively, the network device 302 may be the network device 3 in FIG. 1. A process of processing a packet by the network device 3 is similar to the foregoing description. Details are not described herein again.

When the execution sequence is that the C-SID is first copied and then the value of the CL pointer is updated, and the space including the C-SID in the SID list may be divided into the plurality of elements, in a packet received by the network device 1, a value of a CL pointer is already 2. This indicates a location of a second C-SID in an element. The network device 1 obtains a second C-SID, namely, the C-SID 2, in a first element based on indications of an SL pointer and a CL pointer, and copies the C-SID 2 to a DA field in a packet header to replace the original C-SID 1 in the DA field. The network device 1 updates a value of the CL pointer, for example, modifies the value of the CL pointer to 3, to indicate a location of a third C-SID in a container in the element. In this case, the DA field includes a combination of a prefix part and the C-SID 2, namely, A1:0002:2222, which is a SID of the network device 2. The network device 1 queries a forwarding entry based on the SID of the network device 2 in the DA field, and sends the packet to the network device 2 based on a query result. Another execution process may be obtained by analogy based on the foregoing description. Details are not described herein again.

In an example, the network device 302 determines whether a C-SID in a current DA field is the last C-SID in the element of the SID list. If the C-SID in the current DA field is the last C-SID in the element of the SID list, the network device 302 needs to update the value of the SL pointer and the value of the CL pointer. The plurality of network devices on the packet forwarding path sequentially process the plurality of C-SIDs in the SID list, and after processing a C-SID in one element in the SID list is completed, continue to process a C-SID in a next element. In this case, both the value of the CL pointer and the value of the SL pointer need to be modified, to ensure that the currently to-be-processed C-SID can still be determined based on the value of the CL pointer and the value of the SL pointer.

With reference to the application scenario shown in FIG. 1 and the SID list in the packet shown in FIG. 4B, an example in which the execution sequence is that the value of the SL pointer and the value of the CL pointer are first updated and then the C-SID is copied is still used for description. The network device 302 may be the network device 4 in FIG. 1, and the network device 4 receives a packet sent by the network device 3. In this case, a DA field in a packet header of the packet includes a prefix part and the C-SID 4, namely, A1:0004:4444, which is a SID of the network device 4. In the packet header, a value of an SL pointer is 1, and a value of a CL pointer is 4. This indicates a location of a fourth C-SID, namely, the C-SID 4, in a first element. If the network device 4 determines that the C-SID 4 in the current DA field is the last C-SID in the element of the SID list, the network device 4 needs to update the value of the SL pointer and the value of the CL pointer. Specifically, the network device 4 first updates the value of the SL pointer, for example, modifies the value of the SL pointer to 0, to indicate the second element in the SID list. The second element includes three C-SIDs: a C-SID 5, a C-SID 6, and a C-SID 7. The network device 4 then updates the value of the CL pointer, for example, modifies the value of the CL pointer to 1, to indicate a location of a first C-SID in the element, namely, a location of the C-SID 5 in the element. The network device 4 obtains the first C-SID, namely, the C-SID 5, in the second element based on indications of the SL pointer and the CL pointer, and copies the C-SID 5 to the DA field in the packet header to replace the original C-SID 4 in the DA field. In this case, the DA field includes a combination of the prefix part and the C-SID 5, namely, A1:0005:5555, which is a SID of the network device 5. The network device 4 queries a forwarding entry based on the SID of the network device 5 in the DA field, and sends the packet to the network device 5 based on a query result.

When the execution sequence is that the C-SID first copied and then the value of the SL pointer and the value of the CL pointer are updated, an execution process may be deduced by analogy based on the foregoing description. Details are not described herein again.

In addition, the network device 302 may alternatively be the network device 5, the network device 6, or the network device 7 in FIG. 1. A process of processing a packet by the network device is similar to the foregoing description. Details are not described herein again.

When the space including the C-SID in the SID list is divided into one element, an execution process may be deduced by analogy based on the foregoing description. Details are not described herein again.

Although, in the foregoing example for the application scenario shown in FIG. 1, forwarding processing is performed on a packet at each network device, and forwarding processing behavior performed at each time corresponds to one segment. In this way, a SID list indicating an entire packet forwarding process includes seven SIDs. However, persons skilled in the art can easily anticipate that, in a process of processing a packet, some network devices may also process the packet for a plurality of times. The processing includes forwarding processing and non-forwarding processing. Processing behavior performed at each time corresponds to one segment. Therefore, in the application scenario shown in FIG. 1, the SID list indicating the entire packet forwarding process may include more than 7 SIDs, for example, 10 SIDs.

Figure 6:
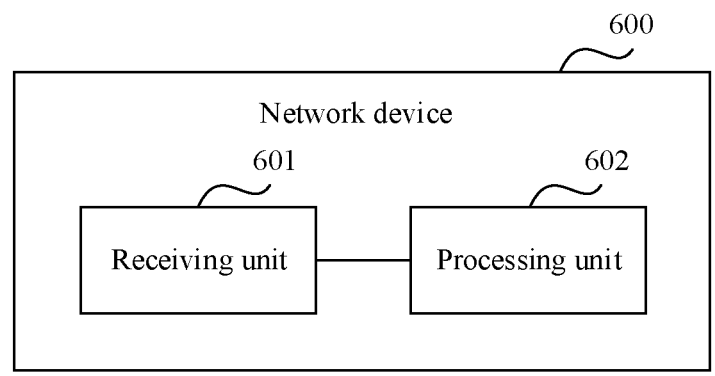
FIG. 6 is a schematic diagram of a structure of a network device according to an embodiment of this disclosure.

FIG. 6 is an optional schematic diagram of a structure of the network device in the foregoing embodiment. A network device 600 may implement a function of the network device 301 in the embodiment shown in FIG. 3. Refer to FIG. 6. The network device 600 includes a receiving unit 601 and a processing unit 602. These units may perform corresponding functions of the network device in the foregoing method embodiment. For example, the receiving unit 601 is configured to receive a packet; and the processing unit 602 is configured to: generate a packet header and encapsulate the packet header into the packet, where the packet header includes a first pointer, a second pointer, and a list used to process the packet, the list includes a plurality of sequentially arranged identifiers, the plurality of identifiers are one-to-one mapped to a plurality of segments on an SR network, and a value of the first pointer and a value of the second pointer jointly indicate a location of a first identifier in the plurality of identifiers in the list; and process the packet encapsulated with the packet header based on the list.

Figure 7:
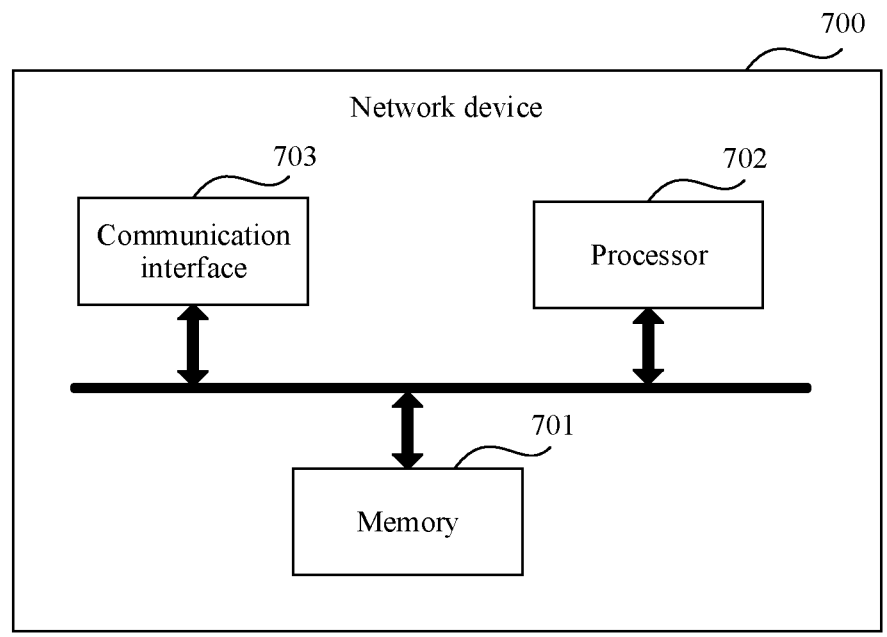
FIG. 7 is a schematic diagram of a structure of a network device according to an embodiment of this disclosure.

FIG. 7 is a schematic diagram of another optional structure of the network device 301 in the foregoing embodiment. A network device 700 includes a processor 702, a network interface 703, and a memory 701.

The memory 701 is configured to store instructions. When the embodiment shown in FIG. 6 is implemented and the units described in the embodiment in FIG. 6 are implemented by using software, software or program code required for performing functions of the processing unit 602 in FIG. 6 is stored in the memory 701.

The processor 702 is configured to execute the instructions in the memory 701, to perform the foregoing packet processing method applied to the embodiment shown in FIG. 3.

The network interface 703 is configured to communicate with another network device.

The network interface 703, the processor 702, and the memory 701 are connected to each other. For example, the network interface 703, the processor 702, and the memory 701 are connected to each other through a bus. The bus may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of representation, only one thick line is used to represent the bus in FIG. 7, but this does not mean that there is only one bus or only one type of bus.

In a specific embodiment, the processor 702 is configured to: receive a packet through the network interface 703; generate a packet header and encapsulate the packet header into the packet, where the packet header includes a first pointer, a second pointer, and a list used to process the packet, the list includes a plurality of sequentially arranged identifiers, the plurality of identifiers are one-to-one mapped to a plurality of segments on an SR network, and a value of the first pointer and a value of the second pointer jointly indicate a location of a first identifier in the plurality of identifiers in the list; and process the packet encapsulated with the packet header based on the list. For a detailed processing process of the processor 702, refer to the detailed description of the process S310, S315, and S320 in the foregoing embodiment shown in FIG. 3. Details are not described herein again.

The network interface 703 is used by the network device 700 to receive and send a packet by using a network system. For a specific process, refer to the detailed description of the process S310 in the foregoing embodiment shown in FIG. 3. Details are not described herein again.

Figure 8:
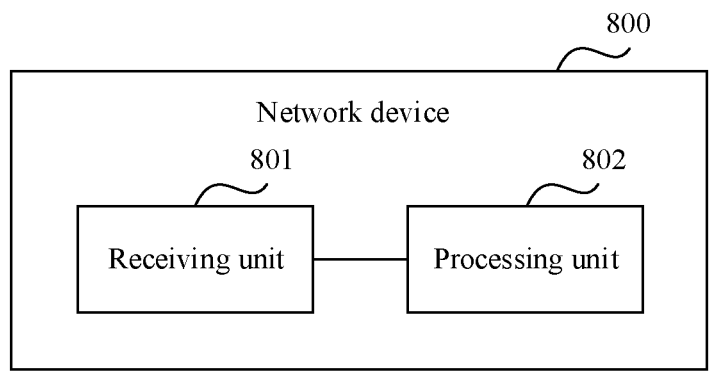
FIG. 8 is a schematic diagram of a structure of a network device according to an embodiment of this disclosure.

FIG. 8 is an optional schematic diagram of a structure of the network device in the foregoing embodiment. The network device 800 may implement a function of the network device 302 in the embodiment shown in FIG. 3. Refer to FIG. 8. The network device 800 includes a receiving unit 801 and a processing unit 802. These units may perform corresponding functions of the network device in the foregoing method embodiment. For example, the receiving unit 801 is configured to receive a packet. A packet header of the packet includes a destination address field, a first pointer, a second pointer, and a list used to process the packet, the list includes a plurality of sequentially arranged identifiers, the plurality of identifiers are one-to-one mapped to a plurality of segments on an SR network, and a value of the first pointer and a value of the second pointer jointly indicate a location of a first identifier in the plurality of identifiers in the list; and the processing unit 802 is configured to: determine the first identifier based on the value of the first pointer and the value of the second pointer; and copy the first identifier to the destination address field.

Figure 9:
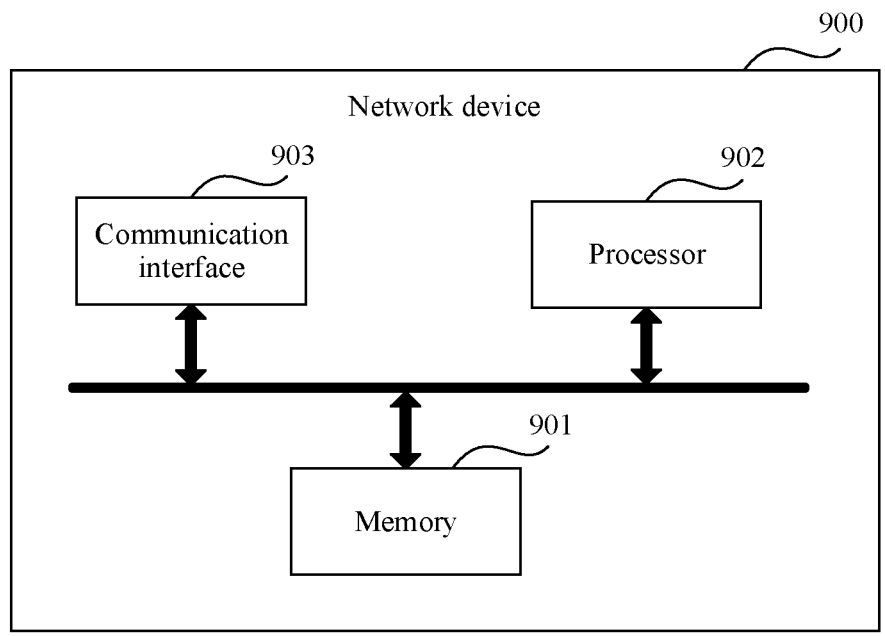
FIG. 9 is a schematic diagram of a structure of a network device according to an embodiment of this disclosure.

FIG. 9 is an optional schematic diagram of a structure of the network device in the foregoing embodiment. The network device 900 includes a processor 902, a network interface 903, and a memory 901.

The memory 901 is configured to store instructions. When the embodiment shown in FIG. 8 is implemented and the units described in the embodiment in FIG. 8 are implemented by using software, software or program code required for performing functions of the receiving unit 801 in FIG. 8 is stored in the memory 901.

The processor 902 is configured to execute the instructions in the memory 901, to perform the foregoing packet processing method applied to the embodiment shown in FIG. 3.

The network interface 903 is configured to communicate with another network device.

The network interface 903, the processor 902, and the memory 901 are connected to each other. For example, the network interface 903, the processor 902, and the memory 901 are connected to each other through a bus. The bus may be a PCI bus, an EISA bus, or the like. The bus may be classified into an address bus, a data bus, a control bus, and the like. For ease of representation, only one thick line is used to represent the bus in FIG. 9, but this does not mean that there is only one bus or only one type of bus.

In a specific embodiment, the processor 902 is configured to: receive a packet through the network interface 903, where a packet header of the packet includes a destination address field, a first pointer, a second pointer, and a list used to process the packet, the list includes a plurality of sequentially arranged identifiers, the plurality of identifiers are one-to-one mapped to a plurality of segments on an SR network, and a value of the first pointer and a value of the second pointer jointly indicate a location of a first identifier in the plurality of identifiers in the list; determine the first identifier based on the value of the first pointer and the value of the second pointer; and copy the first identifier to the destination address field. For a detailed processing process of the processor 902, refer to the detailed description of the process S325, S330, and S335 in the foregoing embodiment shown in FIG. 3. Details are not described herein again.

The network interface 903 is used by the network device 900 to send and receive a packet by using a network system. For a specific process, refer to the detailed description of the process S325 in the foregoing embodiment shown in FIG. 3. Details are not described herein again.

The memory 701 and the memory 901 may be random access memories (RAM), flash memories, read-only memories (ROM), erasable programmable read-only memories (EPROM), electrically erasable programmable read-only memories (EEPROM), registers, hard disks, removable hard disks, CD-ROMs, or any other forms of storage medium known to persons skilled in the art.

The processor 702 and the processor 902 may be, for example, central processing units (CPU), general-purpose processors, digital signal processors (DSP), field programmable gate arrays (FPGA), or other programmable logical devices, transistor logical devices, hardware components, or any combinations thereof. The processor 702 and the processor 902 may implement or execute various example logical blocks, modules and circuits described with reference to content disclosed in this disclosure. Alternatively, the processor may be a combination of processors implementing a computing function, for example, a combination of one or more microprocessors, or a combination of a DSP and a microprocessor.

The network interface 703 and the network interface 903 may be, for example, interface cards, and may be Ethernet interfaces or asynchronous transfer mode (ATM) interfaces. The network interface 703 and the network interface 903 may be wired interfaces or wireless interfaces.

The processor 702 and the processor 902 may be, for example, application-specific integrated circuits (ASIC). In this case, the processor 702 and the processor 902 perform, based on circuits of the processor 702 and the processor 902, the foregoing packet processing method applied to the embodiment shown in FIG. 3. In other words, in this case, the memory 701 and the memory 901 do not need to store the instructions executed by the processor 702 and the processor 902, and the processor 702 and the processor 902 no longer execute the instructions in the memory 701 and the memory 901. Optionally, in this case, the network device may not include the memory 701 or the memory 901.

Figure 10:
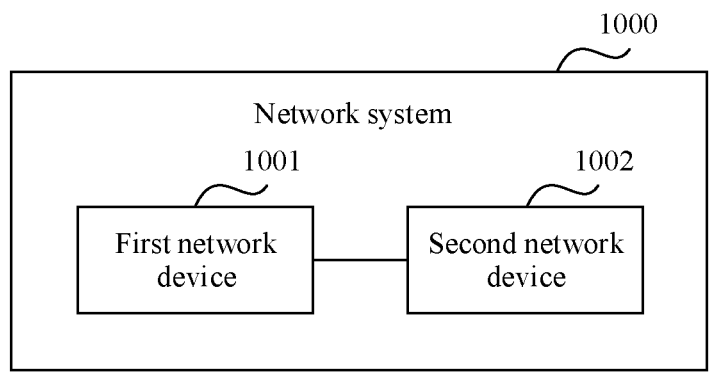
FIG. 10 is a schematic diagram of a structure of a network system according to an embodiment of this disclosure.

FIG. 10 is a schematic diagram of an optional structure of a network system according to an embodiment of the present invention. The network system 1000 includes a first network device 1001 and a second network device 1002. The first network device 1001 in the network system may perform a processing step of the network device 301 in the embodiment shown in FIG. 3, and the second network device 1002 in the network system may perform the processing step of the network device 302 in the embodiment shown in FIG. 3. Correspondingly, the first network device 1001 in the network system may be the network device 600 in the embodiment shown in FIG. 6, and the second network device 1002 may be the network device 800 in the embodiment shown in FIG. 8. Alternatively correspondingly, the first network device 1001 in the network system may be the network device 700 in the embodiment shown in FIG. 7, and the second network device 1002 may be the network device 900 in the embodiment shown in FIG. 9.

Specifically, the first network device is configured to: receive a packet; generate a packet header and encapsulate the packet header into the packet, where the packet header includes a first pointer, a second pointer, and a list used to process the packet, the list includes a plurality of sequentially arranged identifiers, the plurality of identifiers are one-to-one mapped to a plurality of segments on an SR network, and a value of the first pointer and a value of the second pointer jointly indicate a location of a first identifier in the plurality of identifiers in the list; and process the packet encapsulated with the packet header based on the list.

The second network device is configured to: receive a packet, where a packet header of the packet includes a destination address field, a first pointer, a second pointer, and a list used to process the packet, the list includes a plurality of sequentially arranged identifiers, the plurality of identifiers are one-to-one mapped to a plurality of segments on an SR network, and a value of the first pointer and a value of the second pointer jointly indicate a location of a first identifier in the plurality of identifiers in the list; determine the first identifier based on the value of the first pointer and the value of the second pointer; and copy the first identifier to the destination address field.

An embodiment of the present invention further provides a non-transient storage medium, configured to store software instructions used in the foregoing embodiment. The non-transient storage medium includes a program used to perform the methods shown in the foregoing embodiment. When the program is executed on a computer or a network device, the computer or the network device is enabled to perform the method in the foregoing method embodiment.

An embodiment of the present invention further provides a computer program product including computer program instructions. When the computer program product runs on a computer, a network node is enabled to perform the method in the foregoing method embodiment.

In this specification, the claims, and the accompanying drawings of this disclosure, terms "first", "second", "third", "fourth", and the like (if existent) are intended to distinguish between similar objects but do not necessarily indicate a specific order or sequence. It should be understood that the data termed in such a way is interchangeable in proper circumstances, so that the embodiments of the present invention described herein can be implemented in orders other than the order illustrated or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by persons skilled in the art that, for the purpose of convenient and brief description, for a detailed working process of the foregoing system, apparatus, and unit, refer to a corresponding process in the foregoing method embodiment. Details are not described herein again.

In the several embodiments provided in this disclosure, it should be understood that the disclosed system, apparatus, and method may be implemented in other manners. For example, the described apparatus embodiment is merely an example. For example, the unit division is merely logical service division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected based on an actual requirement to achieve the objectives of the solutions of the embodiments.

In addition, service units in the embodiments of this disclosure may be integrated into one processing unit, or each of the units may exist alone physically, or two or more units are integrated into one unit. The integrated unit may be implemented in a form of hardware, or may be implemented in a form of a software service unit.

When the service unit is implemented in the form of a software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this disclosure. The foregoing storage medium includes various media, for example, a USB flash drive, a removable hard disk, a read-only memory (ROM), a random access memory (RAM), a magnetic disk, an optical disc, or another medium that can store program code.

Persons skilled in the art should be aware that in the foregoing one or more examples, the services described in the present invention may be implemented by using hardware, software, firmware, or any combination thereof. When the services are implemented by software, the services may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a general-purpose or a special-purpose computer.

The objectives, technical solutions, and beneficial effects of the present invention have been described in further detail in the foregoing specific implementations. It should be understood that the foregoing description is merely a specific implementation of the present invention.

The foregoing embodiments are merely intended for describing the technical solutions of this disclosure instead of limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this disclosure.

What is claimed is:

1. A packet processing method, wherein the method is applied to a segment routing over Internet protocol version 6 (SRv6) network, and the method comprises:
   receiving a packet, wherein the packet comprises a first pointer, a second pointer, and a segment list, the segment list comprises a plurality of compressed segment identifiers (C-SIDs), and wherein the segment list comprises at least one element, wherein the at least one element comprises a first element, the first element comprises at least two C-SIDs in the plurality of C-SIDs, the at least two C-SIDs include a first C-SID;
   determining the first C-SID in the plurality of C-SIDs in the segment list based on the value of the first pointer and the value of the second pointer, wherein the value of the second pointer indicates the first element in the segment list, and the value of the first pointer indicates the first C-SID in the first element; and
   adding the first C-SID to a destination address field of the packet.

2. The method according to claim 1, wherein the second pointer is a segment left (SL) pointer, the second pointer is comprised in a segment routing header (SRH) of the packet.

3. The method according to claim 1, wherein the first pointer is comprised in an initial C-SID in the at least two C-SIDs, or the first pointer is comprised in the destination address field of the packet.

4. The method according to claim 1, wherein the determining the first C-SID in the plurality of C-SIDs in the segment list based on the value of the first pointer and the value of the second pointer comprises:
   updating the value of the first pointer;
   determining the first C-SID in the plurality of C-SIDs in the segment list based on an updated value of the first pointer and the value of the second pointer.

5. The method according to claim 1, wherein the determining the first C-SID in the plurality of C-SIDs in the segment list based on the value of the first pointer and the value of the second pointer comprises:
   updating the value of the first pointer and the value of the second pointer;
   determining the first C-SID in the plurality of C-SIDs in the segment list based on an updated value of the first pointer and an updated value of the second pointer.

6. The method according to claim 1, wherein the plurality of C-SIDs are one-to-one mapped to a plurality of segment identifiers, each of the plurality of segment identifiers comprises a first part and a second part, the first part is before the second part, first parts of all of the plurality of segment identifiers are the same, and each of the plurality of C-SIDs comprises the second part of each of the plurality of segment identifiers.

7. The method according to claim 6, wherein each of the plurality of C-SIDs does not comprise the first part, the first part is a prefix part of a segment identifier.

8. The method according to claim 6, wherein the destination address field comprises the first part.

9. The method according to claim 1, wherein the length of each of the at least one element is 128 bits.

10. The method according to claim 1, wherein the method further comprises:
    receiving structure information of the destination address field, wherein the structure information indicates an addition location of the first C-SID in the destination address field; and
    the adding the first C-SID to a destination address field of the packet comprises:
    adding the first C-SID to the destination address field of the packet based on the structure information.

11. The method according to claim 10, wherein the receiving structure information of the destination address field comprises:
    receiving a control packet, wherein the control packet comprises the structure information, and the control packet is an intermediate system-to-intermediate system (IS-IS) protocol packet, an open shortest path first (OSPF) protocol packet, or a border gateway protocol (BGP) packet.

12. The method according to claim 1, wherein a length of each of the plurality of C-SIDs is 32 bits or 16 bits.

13. A network device in a segment routing over Internet protocol version 6 (SRv6) network, the network device comprising:
    at least one processor;
    one or more memories coupled to the at least one processor and storing programming instructions, wherein the at least one processor is configured to execute the programming instructions to cause the network device to:
    receive a packet, wherein the packet comprises a first pointer, a second pointer, and a segment list, the segment list comprises a plurality of compressed segment identifiers (C-SIDs), and wherein the segment list comprises at least one element, wherein the at least one element comprises a first element, the first element comprises at least two C-SIDs in the plurality of C-SIDs, the at least two C-SIDs include a first C-SID;
    determine the first C-SID in the plurality of C-SIDs in the segment list based on the value of the first pointer and the value of the second pointer, wherein the value of the second pointer indicates the first element in the segment list, and the value of the first pointer indicates the first C-SID in the first element; and
    add the first C-SID to a destination address field of the packet.

14. The network device according to claim 13, wherein the second pointer is a segment left (SL) pointer, the second pointer is comprised in the segment routing header (SRH) of the packet.

15. The network device according to claim 13, wherein the first pointer is comprised in an initial C-SID in the at least two C-SIDs, or the first pointer is comprised in the destination address field of the packet.

16. The network device according to claim 13, wherein the network device is further caused to:
    update the value of the first pointer;
    determine the first C-SID in the plurality of C-SIDs in the segment list based on an updated value of the first pointer and the value of the second pointer.

17. The network device according to claim 13, wherein the network device is further caused to:
  update the value of the first pointer and the value of the second pointer;
  determine the first C-SID in the plurality of C-SIDs in the segment list based on an updated value of the first pointer and an updated value of the second pointer.

18. The network device according to claim 13, wherein the plurality of C-SIDs are one-to-one mapped to a plurality of segment identifiers, each of the plurality of segment identifiers comprises a first part and a second part, the first part is before the second part, first parts of all of the plurality of segment identifiers are the same, and each of the plurality of C-SIDs comprises the second part of each of the plurality of segment identifiers.

19. The network device according to claim 18, wherein each of the plurality of C-SIDs does not comprises the first part, the first part is a prefix part of a segment identifier.

20. The network device according to claim 18, wherein the destination address field comprises the first part.

21. The network device according to claim 13, wherein the length of each of the at least one element is 128 bits.

22. The network device according to claim 13, wherein the network device is further caused to:
  receive structure information of the destination address field, wherein the structure information indicates an addition location of the first C-SID in the destination address field; and
  add the first C-SID to the destination address field of the packet based on the structure information.

23. The network device according to claim 22, wherein the network device is further caused to:
  receive a control packet, wherein the control packet comprises the structure information, and the control packet is an intermediate system-to-intermediate system (IS-IS) protocol packet, an open shortest path first (OSPF) protocol packet, or a border gateway protocol (BGP) packet.

24. The network device according to claim 13, wherein a length of each of the plurality of C-SIDs is 32 bits or 16 bits.

25. A network system, comprising: a first network device and a second network device in a segment routing over Internet protocol version 6 (SRv6) network,
  wherein the first network device is configured to:
    receive a packet;
    add a first pointer, a second pointer, and a segment list to a packet header of the packet, the segment list comprises a plurality of compressed segment identifiers (C-SIDs), and wherein the segment list comprises at least one element, wherein the at least one element comprises a first element, the first element comprises at least two C-SIDs in the plurality of C-SIDs, the at least two C-SIDs include a first C-SID; and
    send the packet encapsulated with the packet header to the second network device;
  wherein the second network device is configured to:
    receive the packet;
    determining the first C-SID in the plurality of C-SIDs in the segment list based on the value of the first pointer and the value of the second pointer, wherein the value of the second pointer indicates the first element in the segment list, and the value of the first pointer indicates the first C-SID in the first element; and
    adding the first C-SID to a destination address field of the packet.

26. The network system according to claim 25, wherein the second pointer is a segment left (SL) pointer, the second pointer is comprised in the segment routing header (SRH) of the packet.

27. The network system according to claim 25, wherein the first pointer is comprised in an initial C-SID in the at least two C-SIDs, or the first pointer is comprised in the destination address field of the packet.

28. The method according to claim 1, wherein the method comprises:
  adding only the first C-SID to a destination address field of the packet;
  wherein the first element further comprises a second C-SID, the second C-SID is a subsequent C-SID of the first C-SID in the at least two C-SIDs, and the second C-SID is not added to the destination address field of the packet.

29. The network device according to claim 13, wherein the at least one processor is further configured to execute the programming instructions to cause the network device to:
  adding only the first C-SID to a destination address field of the packet;
  wherein the first element further comprises a second C-SID, the second C-SID is a subsequent C-SID of the first C-SID in the at least two C-SIDs, and the second C-SID is not added to the destination address field of the packet.

* * * * *